United States Patent
Barbu et al.

(10) Patent No.: US 8,724,603 B2
(45) Date of Patent: May 13, 2014

(54) NETWORK ACCESS AND A MOBILE STATION CONFIGURED FOR THE SAME

(75) Inventors: Ion Barbu, Waterloo (CA); Krishna Kumar Bakthavathsalu, Toronto (CA); Ahmad Mohammad Mohammad Kholaif, Waterloo (CA); Nayef Fawaz Mendahawi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 307 days.

(21) Appl. No.: 13/042,500

(22) Filed: Mar. 8, 2011

(65) Prior Publication Data
US 2012/0230304 A1    Sep. 13, 2012

(51) Int. Cl.
*H04W 80/00*    (2009.01)

(52) U.S. Cl.
USPC .................................................. 370/338

(58) Field of Classification Search
None
See application file for complete search history.

(56) References Cited

U.S. PATENT DOCUMENTS

| | | | |
|---|---|---|---|
| 7,363,379 B2 | 4/2008 | Tejaswini et al. | |
| 2004/0266430 A1 | 12/2004 | Fudim et al. | |
| 2005/0071476 A1 | 3/2005 | Tejaswini et al. | |
| 2007/0066304 A1 | 3/2007 | Lee | |
| 2007/0091861 A1 | 4/2007 | Gupta et al. | |
| 2008/0004009 A1* | 1/2008 | Caldwell et al. | 455/434 |
| 2009/0028082 A1 | 1/2009 | Wynn et al. | |
| 2009/0068970 A1 | 3/2009 | Ahmed et al. | |

FOREIGN PATENT DOCUMENTS

| | | |
|---|---|---|
| EP | 1863313 | 12/2007 |
| WO | WO 2008025003 | 2/2008 |

OTHER PUBLICATIONS

Convergence Services over Wi-Fi GAN (UMA), Release 1, Fixed-Mobile Convergence Alliance, Aug. 31, 2005, http://www.thefmca.com/assets/pdf/fmca_Wi-Fi_GAN_(UMA)PRD_release_1.pdf.
Extended European Search Report; EP 11157302.8; Sep. 30, 2011.
Extended European Search Report; EP 11157305.1; Jul. 8, 2011.

* cited by examiner

*Primary Examiner* — Faruk Hamza
*Assistant Examiner* — Alan Lindenbaum
(74) *Attorney, Agent, or Firm* — Ridout & Maybee LLP

(57) ABSTRACT

A method for network access and a mobile station configured for the same is described. In one embodiment, there is provided a method for network access on a mobile station comprising: scanning for Wi-Fi networks; receiving responses from available wireless access points (APs) of the Wi-Fi networks; selecting a Wi-Fi network in accordance with past connectivity data associated with the Wi-Fi networks of the available APs; and attempting to connect to the selected Wi-Fi network.

18 Claims, 7 Drawing Sheets

NETWORK ACCESS AND A MOBILE STATION CONFIGURED FOR THE SAME

TECHNICAL FIELD

The present disclosure relates to communication networks, and more particularly to a method for improved network access and a mobile station configured for the same.

BACKGROUND

Unlicensed Mobile Access (UMA) extends mobile voice, data and IP Multimedia Subsystem applications over IP access networks. Mobile telephones can connect to UMA networks through wireless access points (APs). When a Mobile telephone scans for Wi-Fi networks, it scans for all Wi-Fi networks having profiles stored in memory and will try to connect to these networks in order of descending user priority. However, at any given time not all Wi-Fi networks stored in memory may be available or provide the same quality, including but not limited to, the quality of UMA network access. Thus, there remains a need for improved methods of accessing Wi-Fi networks and UMA networks.

BRIEF DESCRIPTION OF THE DRAWINGS

Similar reference numerals may have been used in different figures to denote similar components.

DETAILED DESCRIPTION OF EXAMPLE EMBODIMENTS

Figure 1:
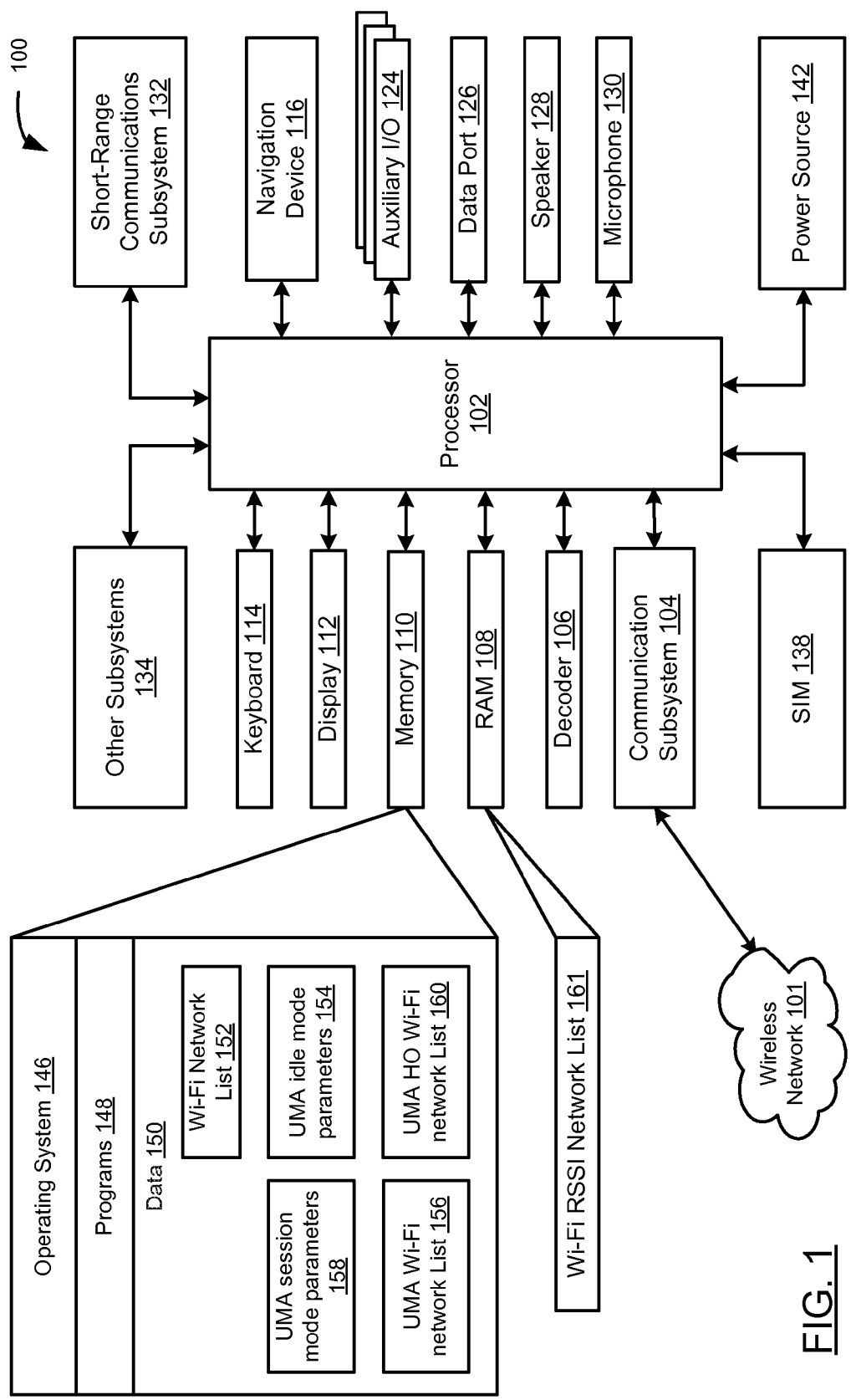
FIG. 1 is a simplified block diagram of components of a mobile station in accordance with one example embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, tablet computing devices, and so forth. The portable electronic device may also be a portable electronic device with or without wireless communication capabilities, such as a handheld electronic game device, digital photograph album, digital camera, or other device.

The present disclosure describes methods which attempt to improve access to UMA networks. In particular, the present disclosure seeks to address observed problems with UMA network connections over WLAN networks (e.g., Wi-Fi networks). Firstly, WLAN networks listed within a Wi-Fi network list of a mobile station sometimes fail to acquire UMA connectivity with the same or similar performance over a period of time. The network response for UMA acquisition may vary from one WLAN to another due to domain name system (DNS) failures, virtual private network (VPN) timeouts and general packet losses. Secondly, not all WLAN Networks environments, are able to provide the same number of successful UMA handovers (HOs) every time as the radio frequency (RF) environment on Wi-Fi spectrum may change.

The present disclosure describes a method for prioritizing Wi-Fi networks for UMA connection. Normal Wi-Fi priorities, such as user-defined Wi-Fi priorities, are overridden. Signal strength of available wireless access points and past UMA experience with UMA networks, such as UMA connection time or the number of UMA handovers, are Used in for prioritizing Wi-Fi networks. The mobile station may attempt to connect to the Wi-Fi network having the highest UMA parameter or, may only scan for Wi-Fi networks having past UMA connectivity data. If there is no UMA connectivity data or UMA capability is not provisioned on the mobile station, RSSI sorting criteria may be used.

In accordance with one embodiment of the present disclosure, there is provided a method for network access on a mobile station comprising: scanning for Wi-Fi networks; receiving responses from available wireless access points (APs) of the Wi-Fi networks; selecting a Wi-Fi network in accordance with past connectivity data associated with the Wi-Fi networks of the available APs; and attempting to connect to the selected Wi-Fi network.

In accordance with another embodiment of the present disclosure, there is provided a mobile station comprising: a processor; a display connected to the processor; a cellular communication subsystem connected to the processor configured for communication over a cellular radio network; a Wi-Fi communication subsystem connected to the processor configured for communication over a Wi-Fi network; and a memory connected to the processor having stored thereon a Wi-Fi network list including one or more Wi-Fi profiles in accordance with IEEE 802.11 standards; wherein the processor is configured for: causing scanning for Wi-Fi networks having a stored Wi-Fi profile; receiving responses from available APs of the Wi-Fi networks; selecting a Wi-Fi network in accordance with past connectivity data associated with the Wi-Fi networks of the available APs; and causing attempting to connect to the selected Wi-Fi network.

In accordance with a further embodiment of the present disclosure, there is provided a method for Wi-Fi network access on a mobile station comprising: scanning for wireless access points (APs) of a Wi-Fi network; receiving responses from available APs of the Wi-Fi network; selecting an AP in accordance with past connectivity data associated with the available APs; and attempting to connect or switch to the Wi-Fi network using the selected AP.

In accordance with yet a further embodiment of the present disclosure, there is provided a mobile station comprising: mobile station comprising: a processor; a Wi-Fi communication subsystem connected to the processor configured for communication over a Wi-Fi network; and a memory connected to the processor having stored thereon a Wi-Fi network list including one or more Wi-Fi profiles in accordance with IEEE 802.11 standards; wherein the processor is configured for: causing scanning for wireless access points (APs) of a Wi-Fi network; receiving responses from available wireless access points (APs); selecting an AP in accordance with past connectivity data for the available APs; and causing attempting to connect or switch to the Wi-Fi network using the selected AP.

A block diagram of an example of a mobile station 100 is shown in FIG. 1. The mobile station 100 includes multiple components, such as a processor 102 that controls the overall operation of the mobile station 100. Communication functions, including data and voice communications, are performed through a communication subsystem 104. The communication subsystem 104 comprises both a cellular communication subsystem (not shown) and a wireless local area network (WLAN) communication subsystem (not shown), such as a Wi-Fi communication subsystem (not shown). Data received by the mobile station 100 is decompressed and decrypted by a decoder 106. The communication subsystem 104 receives messages from and sends messages to a wireless network 101. A power source 142, such as one or more rechargeable batteries or a port to an external power supply, powers the mobile station 100.

The mobile station 100 is a UMA-enabled dual-mode cellular/Wi-Fi mobile station. With the UMA-enabled dual-mode mobile station 100 subscribers may automatically handover between cellular and Wi-Fi networks, continuing the set of services as they transition between cellular network and Wi-Fi networks as described more fully below.

The processor 102 interacts with other components, such as Random Access Memory (RAM) 108, memory 110, a display 112 (such as a liquid crystal display (LCD)), a keyboard 114, a navigation device 116, a digital camera 120, one or more auxiliary input/output (I/O) subsystems 124, a data port 126 (such as a universal serial bus (USB) port), a speaker 128, a microphone 130, short-range communications subsystem 132, and other device subsystems 134. The navigation device 116 may be a depressible/clickable trackball, a depressible/clickable scroll wheel, a touch-sensitive optical trackpad, or a touch-sensitive touchpad. User-interaction with a graphical user interface (GUI) is performed via input devices such as the keyboard 114 and navigation device 116. Information, such as text, characters, symbols, images, icons, and other items that may be displayed or rendered on the mobile station, is displayed on the display 112 via the processor 102.

The auxiliary I/O subsystems 124 may include one or more of the following: control buttons or keys, a numeric or special function keypad, a touch-sensitive display, a notification light such as a light emitting diode (LED), or a vibrator or other mechanism for providing haptic/touch feedback. In other embodiments, a touch-sensitive display may be provided instead of or in addition to the keyboard 114 and navigation device 116 described above.

To identify a subscriber for network access, the mobile station 100 uses as a Subscriber Identity Module (SIM) card 138 for communicating with the wireless network 101. The SIM card 138 is a smart card which stores data to authenticate and identify a subscriber for communication with the wireless network 101 and possibly other networks. The data stored by the SIM card 138 and the configuration of the SIM card 138 depends on the type of wireless network(s) 101 with which the SIM card 138 is designed to operate.

The SIM card 138 stores network specific information used to authenticate and identify subscribers on the wireless network(s) 101 with which it is designed to operate including, for example, an Integrated Circuit Card ID (ICC-ID), International Mobile Subscriber Identity (IMSI), Authentication Key (Ki), Local Area Identity (LAI) and operator specific Emergency Number. The SIM card 138 may also store carrier specific data such as the SMSC (Short Message Service Center) number, Service Provider Name (SPN), Service Dialing Numbers (SDN), Advice-Of-Charge parameters and Value Added Service (VAS) applications.

The mobile station 100 includes an operating system 146, software applications or programs 148 that are executed by the processor 102, and data 150 that are typically stored in a persistent, updatable store such as the memory 110. Additional applications or programs 148 may be loaded onto the mobile station 100 through the wireless network 101, the auxiliary I/O subsystem 124, the data port 126, the short-range communications subsystem 132 or any other suitable subsystem 134. The data 150 includes a Wi-Fi network list 152 including Wi-Fi profiles for connecting to Wi-Fi networks. The memory 110 also includes past connectivity data (e.g., usage statistics) for the Wi-Fi networks. The past connectivity data may include information relating to UMA connectivity (e.g., UMA statistics), Wi-Fi connectivity (e.g., Wi-Fi statistics) or both. The past connectivity data comprises Wi-Fi and/or UMA connection information (e.g., statistics) regarding past Wi-Fi and/or UMA connections, such as duration, number of connections, time to connect to a network connectivity (e.g., a time required to acquire Wi-Fi or UMA connectivity), amount of data transmitted, etc. The past connectivity data, in some examples includes but is not limited to, UMA idle mode parameters 154, UMA Wi-Fi network list 156, UMA session mode parameters 158 and a UMA HO Wi-Fi network list 160. The past connectivity data may be maintained and stored for each Wi-Fi network (e.g., in accordance with SSID), for each AP 214 (e.g., in accordance with BSSID) or both. Alternatively, the past connectivity data and Wi-Fi network lists may be stored in RAM 108. A Wi-Fi RSSI network list 161 is generated temporarily at runtime and is typically stored in RAM 108, although it may be stored in memory 110.

The UMA connection details are provisioned by the mobile network service provider for connecting to one or more UMA networks 204 (FIG. 2) described below, and stored in a persistent store such as the memory 110. The UMA connection details are used by the mobile station 100 after connecting to a Wi-Fi network to make a corresponding connection to a UMA network 204, for example, for connecting to a UMA network controller (UNC) 218 (FIG. 2) of the UMA network 204. The UNC 218 is part of the core network provided by the mobile network service provider of the mobile station 100.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 101 through the communication subsystem 104. For voice communications, the overall operation of the mobile station 100 is similar. The speaker 128 outputs audible information converted from electrical signals, and the microphone 130 converts audible information into electrical signals for processing.

Figure 2:
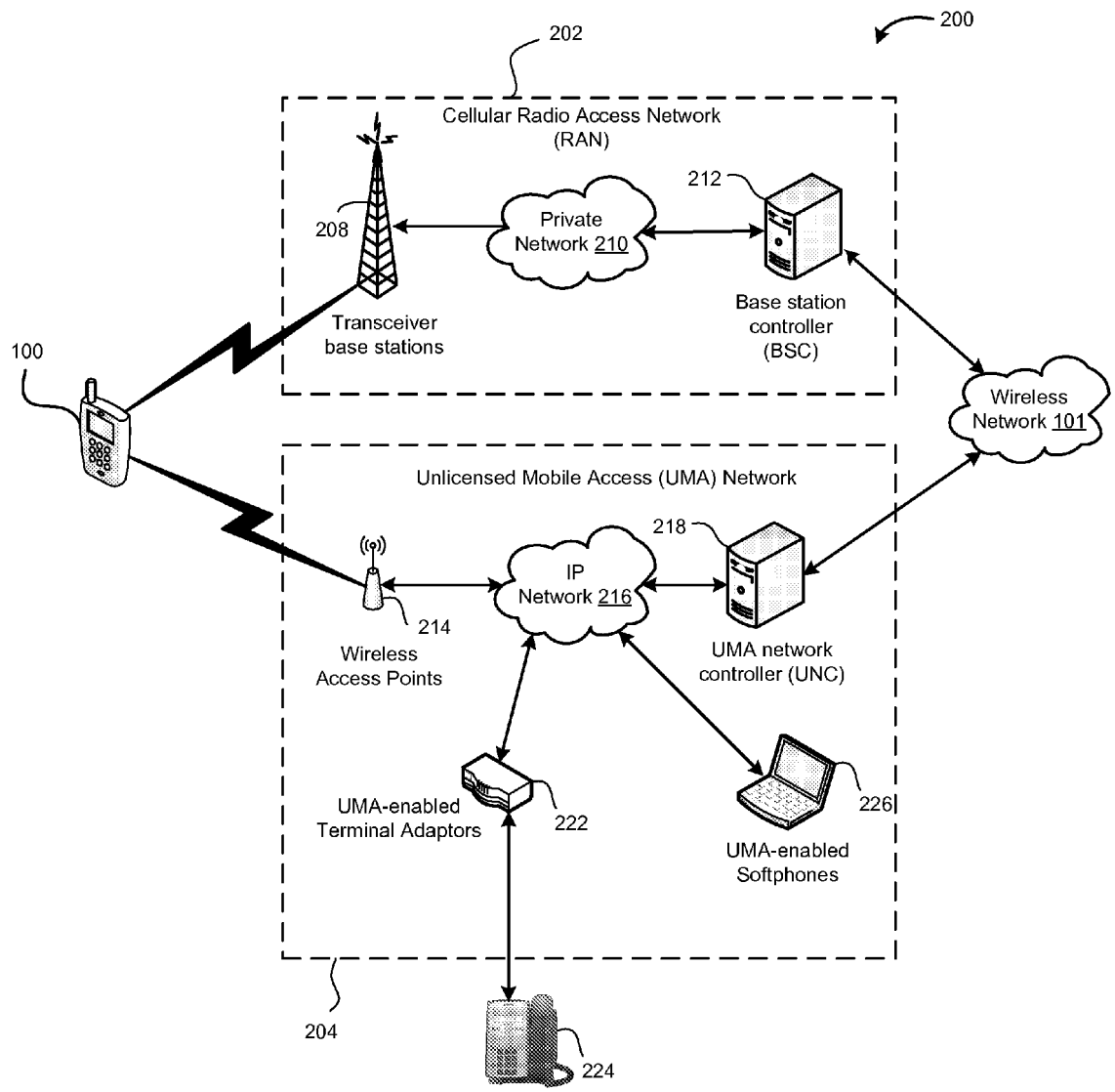
FIG. 2 is a block diagram illustrating a communication system in which example embodiments of the present disclosure may be applied.

Reference is now made to FIG. 2 which shows in block diagram form a communication system 200 in which example embodiments of the present disclosure may be applied. The communication system 200 includes a cellular radio access network (RAN) 202 and a UMA network 204 such as a Wi-Fi GAN. The mobile station 100, being a dual-mode communication device, may connect to either the cellular RAN 202 or UMA network 204 at any given time. The communication system 200 may comprise multiple cellular RANs 202 and multiple UMA networks 204 even though only one network of each type is shown in FIG. 2. As noted above, the mobile station 100 is a UMA-enabled dual-mode cellular/Wi-Fi mobile station configured to communicate over both the cellular RAN 202 and UMA network 204 and to roam between these networks.

The cellular RAN 202 is typically operated by a mobile network service provider that provides subscriptions to users of mobile stations 100 (one of which is shown in FIG. 2). The cellular RAN 202 comprises a number of transceiver base stations 208 (one of which is shown in FIG. 2) each of which provides wireless radio frequency (RF) coverage to a corresponding area or cell. Each of the transceiver base stations 208 is connected to a private network 210, such as a time-division multiplexing (TDM) network, of the corresponding mobile network service provider. The private network 210 connects to a base station controller 212. The base station controller 212 connects to the core wireless network 101, which may be any suitable type of wireless network, including, but not limited to, a wireless data network, wireless voice network, or a wireless voice and data network. In some example embodiments, the wireless network 101 is a GSM EDGE Radio Access Network (GERAN).

UMA is the commercial name of the 3rd Generation Partnership Project (3GPP) Generic Access Network (GAN) standard. UMA is a telecommunication system that gives access to mobile voice, data and IP Multimedia Subsystem (IMS)/Session Initiation Protocol (SIP) applications over IP access networks. UMA is described further in the publication entitled "Convergence Services over Wi-Fi GAN (UMA)", Release 1, published by the Fixed-Mobile Convergence Alliance (FMCA) on Aug. 31, 2005, the contents of which are incorporated herein by reference.

The UMA network 204 is implemented using an unlicensed wireless technology, such as a wireless local area network (WLAN) based on the IEEE 802.11 standards or a wireless personal area network (WPAN) based on the IEEE 802.15 standards. The WLAN may be, for example, a Wi-Fi network. The WPAN may be, for example, an Infrared Data Association (IrDA), Bluetooth®, UltraWideband (UWB), Z-Wave or ZigBee wireless network. The UMA network 204 includes one or more APs 214 (one of which is shown in FIG. 2) that provide a coverage area. When the UMA network 204 uses Wi-Fi, the APs 214 are Wi-Fi access points. The cellular RAN 202 and UMA network 204, in at least some examples, are configured in accordance with the specification set forth in the "Convergence Services over Wi-Fi GAN (UMA)" publication noted above.

The APs 214 may belong to, for example, a personal network of the device user, an enterprise network, or a hotspot offered by an Internet service provider (ISP), a mobile network provider, or a property owner in a public or semi-public area. The APs 214 are connected to an Internet Protocol (IP) network 216 such as the Internet. The APs 214 connects to a UMA network controller (UNC) 218 via the IP network 216. The UNC 218 interfaces with the core wireless network 101 via 3GPP interfaces.

The UNC 218 is deployed within a mobile network provider's core network. The UNC 218 extends mobile circuit, packet and IMS-based services over IP access networks. The UNC 218 interfaces the IP network 216, such as the Internet, with the mobile network provider's core network systems. The UNC 218 establishes secure connections to mobile stations 100 over the IP network 216 and manages delivery of mobile services, as well as mobility between access networks.

The communication system 200 may also include UMA-enabled terminal adaptors 222. UMA-enabled terminal adaptors 222 adapt a standard analog fixed telephone 224 to a subscriber's existing broadband/IP service. UMA-enabled terminal adaptors 222 enable mobile network providers to use an R99 or R4 core network to deliver service over broadband/IP access networks (e.g., broadband telephony).

The communication system 200 may also include UMA-enabled softphones 226 (also known as UMA-enabled software phones 226). UMA-enabled softphones 226 are software clients on computers which provided Voice over Internet Protocol (VoIP) services. The UMA-enabled softphones 224 may be on a fixed computer or mobile computer such as a laptop with broadband access or access to an AP 214. Mobile implementations are sometimes referred to as "softmobiles". In some embodiments, UMA-enabled softphones 224 are provided by a memory stick with an embedded SIM which may be connected to a computer. For example, a USB memory stick may be inserted into a USB port of a laptop computer by the subscriber to access the UMA-enabled softmobile service via a UMA-enabled softmobile client on the memory stick. The UMA-enabled softmobile client may automatically launch and connect over IP to the subscriber's "home" mobile service provider. From that point, the subscriber may make and receive mobile voice calls as if he or she was in their home calling area. The service would function in a similar manner to softphone clients provided by conventional VoIP providers.

The mobile station 100 can roam between APs 214 in the same Wi-Fi network when the signal quality of the current AP 214 drops below a defined threshold. The mobile station 100 can roam between APs 214 within the same Wi-Fi network (same SSID as current AP 214). The mobile station 100 internally measures a signal quality indication (e.g. RSSI) to determine the signal quality of APs 214 which are in range. The mobile station 100 may, in some examples, measure RSSI values between −45 dBm and −86 dBm with a step size of 1 dB. An inter-AP 'roaming threshold' may be set such that there is reasonable opportunity to discover other APs 214 when the signal from the current AP 214 drops. When the signal from the current AP 214 drops and another AP 214 is available, the motion station 100 switches from the current AP 214 to another AP within the same Wi-Fi network. When the mobile station 100 is in Wi-Fi mode when the signal from the current AP 214 drops before another AP 214 is found, the mobile station 100 switches to cellular mode.

The mobile station 100 can rove-in (switch from cellular mode to Wi-Fi mode) when the UMA network 204 is suitable and rove-out (switch from Wi-Fi mode to cellular mode) when the cellular RAN 202 is suitable. The UMA network 204 supports seamless roving between the cellular RAN 202 and the UMA network 204. The UMA network 204 also supports seamless roving between APs 214 within a Wi-Fi network 204, also referred to as inter-AP transfers. The UMA network 204 may support rove-in and rove-out timers to limit the number of consecutive network changes (e.g. ping pong effect) to reduce network signalling. Mode selection settings, for example stored in memory 110, may determine when the mobile station 100 rove-in and rove-out.

Handover occurs when the mobile station 100 moves from one AP 214 point to another or between the UMA network 204 and cellular RAN 202 while engaged in a call, data session or both. When the mobile station 100 is engaged on a voice call in Wi-Fi mode and the voice quality drops below a defined threshold (measured on the downlink, e.g. signal strength, error rate) then the mobile station 100 may initiate a handover to cellular mode. The mobile station 100 may initiate a handover from the UMA network 204 to the cellular RAN 202 if the uplink or downlink signal quality indication provided by the UNC 218 (e.g., measured at the IP-layer) indicates that the link quality has fallen below a defined threshold.

The communication system 200 is described for the purpose of illustration and is not intended to be limiting. The communication system 200 is one possible communication network configuration of a multitude of possible configurations for use with the mobile stations 100. The teachings of the present disclosure may be employed in connection with other types of networks and mobile stations.

When the mobile station 100 successfully associates and authenticates with an AP 214 for the first time it stores connection Wi-Fi network details, such as association and/or authentication details, in a Wi-Fi profile in the Wi-Fi network list 152 stored in the memory 110 of the mobile station 100. In larger Wi-Fi network deployments, such as enterprise deployments, a Wi-Fi network may have multiple APs 214. In such deployments, the Wi-Fi network is a network of APs 214. When a Wi-Fi network comprises multiple APs 214, each AP 214 in the network shares the same service set identifier (SSID) and is associated with the same (e.g., common) Wi-Fi profile in the Wi-Fi network list 152. The SSID is a name that identifies a particular 802.11 wireless LAN. APs 214 in the same Wi-Fi network are differentiated by a Basic Service Set Identifier (BSSID) associated with each AP 214. The BSSID is a MAC (Medium Access Control) address of the AP 214.

Each Wi-Fi profile in the Wi-Fi network list 152 has a number of Wi-Fi network connection details stored in memory 100 such as, but not limited to, Media Access Control (MAC) address, IP address, Quality of Service (QoS)/Differentiated Services Code Point (DSCP) settings, AP details, SSID and security settings. One or more Wi-Fi profiles, or possibly the entire Wi-Fi network list 152, may be pushed to mobile stations 100 by an IT (information technology) administrator of a network and/or wireless connector system (not shown) providing at least some of the mobile services of the mobile stations 100.

Pushed Wi-Fi profiles or the Wi-Fi network list 152, when received by the mobile stations, are saved in the respective memory 110 of the mobile stations 100. The Wi-Fi profiles or Wi-Fi network list 152 may be pushed by using IT policy messages sent to the mobile stations 100. IT policy is typically stored in the memory 110 of the mobile station 100 in a protected area which may not be tampered with by the device user. IT policy is typically pushed to supported mobile stations 100 when an IT policy change occurs. The periodic transmission of IT policy messages assists in ensuring, among other things, that each of the mobile stations 100 is kept up to date with the latest IT policies, for example, the list of known, preferred or authorized Wi-Fi profiles which provide UMA network access.

The wireless connector system may be operated, for example, by an organization or enterprise such as a corporation, university, or governmental department, which allows access to a private network such as an internal or enterprise network and its resources, or the wireless connector system may be operated by a mobile network service provider. A wireless network gateway (not shown) typically provides an interface between the wireless connector system and the cellular RAN 202, which facilitates communication between the mobile stations 100 and other devices (not shown) connected, directly or indirectly, to the cellular RAN 2022. Accordingly, communications sent via the mobile stations 100 are transported via the cellular RAN 202 and the wireless network gateway through network transport facilities to the wireless connector system. Communications sent from the wireless connector system are received by the wireless network gateway and transported via the cellular RAN 202 to the mobile stations 100.

When attempting a Wi-Fi connection, mobile stations 100 attempt to connect to Wi-Fi networks corresponding to Wi-Fi profiles saved in the Wi-Fi network list 152 in descending order of user priority in accordance with the IEEE 802.11 standards. The Wi-Fi network list 152 defines priority based on the order in the Wi-Fi network list 152, i.e. the position of each Wi-Fi profile in the Wi-Fi network list 152 corresponds to the priority rank given by the device user of the respective Wi-Fi profile. The Wi-Fi network list 152 defines a descending order of priority with Wi-Fi profiles lower in the Wi-Fi network list 152 having successively lower priority. The Wi-Fi network list 152 may be edited by the user of the mobile station, for example, to remove unwanted Wi-Fi profiles, or may be (re)configured to change the positions/priority rank of Wi-Fi profiles in the Wi-Fi network list 152. A pushed Wi-Fi network list 152 may be used to set the priority rank of Wi-Fi profiles used by mobile stations 100.

Improved UMA Network Access

As described in more detail below in connection with FIGS. 3 to 5, a mobile station 100 configured in accordance with the present disclosure generates a UMA Wi-Fi network list 156 comprising UMA-enabled Wi-Fi profiles based on UMA idle mode parameters 154. Idle mode occurs when the mobile station 100 is connected to the UMA network 204 but is not in a UMA session such as a voice call or data transfer. The UMA idle mode parameters 154 comprise UMA idle mode connectivity data or statistics which are stored in, or in association with, each Wi-Fi profile entry in the Wi-Fi network list 152. The mobile station 100 maintains UMA idle mode connectivity data for each Wi-Fi profile in the Wi-Fi network list 152. The UMA idle mode parameters 154 may include, but is not limited to, one or any combination of the following:

(1) Frequency counter—the counter may store how many times UMA network access was acquired using the Wi-Fi profile, or ratio/rate of the number successful and unsuccessful UMA connections, or both;

(2) Maximum UMA connection time—the longest duration for the last UMA connection using the Wi-Fi profile or the duration of the UMA connection;

(3) Expiry timer (also known as an aging timer)—the duration after which the Wi-Fi profile will be removed from the UMA Wi-Fi network list 156.

The frequency counter and expiry timer values may be predefined and stored in the memory 110, configurable by the user, or pushed to the mobile station 100 via IT policy messages (e.g., pushed by the mobile service network provider, or enterprise). As noted above, the IT policy in received IT policy messages is stored in the memory 110. A typical value of the expiry timer is 24, 36 or 48 hours. A default value of the expiry timer may be set to 24 hours, for example, via the IT policy.

The expiry timer reflects the fact that UMA connectivity data is quickly out-dated and may become inaccurate as it ages due to changes in RF (radio frequency) environment. For example, UMA connectivity data relating to one location may be of no use when attempting UMA network access in another location because the APs 214 (or other type of UMAN AP) and associated UMA networks 204 may be different. For example, connectivity data relating to a user's home or office may not be useful when selecting an AP 214 at the user's cottage or when on vacation.

The mobile station 100 also generates a UMA HO Wi-Fi network list 160 comprising UMA-enabled Wi-Fi profiles based on UMA session mode parameters 158. Session mode occurs when the mobile station 100 is connected to the UMA network 204 and is in a UMA session such as a voice call or data transfer. The UMA session mode parameters 158 comprise UMA session mode connectivity data or statistics which are stored in, or in association with, each Wi-Fi profile entry in the Wi-Fi network list 152. The mobile station 100 maintains UMA session mode connectivity data for each Wi-Fi profile in the Wi-Fi network list 152. The UMA session mode parameters 158 may include, but is not limited to, one or any combination of the following:

(1) handover counter—the total successful handovers performed (e.g., Successful_HO_count=Successful_HO_IN_count+Successful_HO_OUT_count);

(2) handover failure counter—total unsuccessful handovers performed (e.g., Unsuccessful_HO_count=Unsuccessful_HO_IN_count+Unsuccessful_HO_OUT_count);

(3) handover successful/unsuccessful ratio (or rate)—the number of successful handovers to unsuccessful handovers performed; or (4) longest UMA session (e.g., voice call or data session) duration performed (e.g., previous n hours).

Other UMA idle mode parameters 154 and UMA session mode parameters 158 are possible. The UMA idle mode parameters 154 and UMA session mode parameters 158 are stored per SSID to measure overall Wi-Fi network experience. The UMA connectivity data/statistics are collected based on the overall UMA session experience of all APs 214 of a Wi-Fi network. The mobile station 100 selects Wi-Fi networks based on the UMA connectivity data/statistics to select the Wi-Fi network having the best UMA capability. The network having the "best" UMA capability is the network having the highest UMA statistic (in idle or session mode) of a particular type or types (e.g., most connections, highest handover successful/unsuccessful ratio, etc.). RSSI values, which are also considered in network selection as described below, are specific to individual APs 214 in the same or different Wi-Fi networks.

The UMA Wi-Fi network list 156 and UMA HO Wi-Fi network list 160 may be stored in memory 110, or may be run-time parameters stored in RAM 108 for used when attempting to connect or reconnect to a UMA network 204. The UMA idle mode parameters 154 and UMA session mode parameters 158 are persistent, and may be stored in the memory 110. The UMA idle mode parameters 154 and UMA session mode parameters 158 may be cleared from time-to-time for all Wi-Fi profiles, or individual Wi-Fi profiles (e.g., per SSID). For example, the UMA idle mode parameters 154 and UMA session mode parameters 158 may be cleared for individual Wi-Fi profiles by disabling and re-enabling the corresponding Wi-Fi profiles 152 or selecting reset option provided by the GUI of the mobile station 100. The UMA idle mode parameters 154 and UMA session mode parameters 158 may be cleared for all Wi-Fi profiles by turning the Wi-Fi radio on and off, removing the power source 142 (e.g., battery), or selecting reset option provided by the GUI of the mobile station 100.

Each time the mobile station 100 disconnects from the UMA network 204, for any reason, the mobile station 100 updates the UMA connectivity data, such as the UMA idle mode parameters 154 and/or UMA session mode parameters 158, for the Wi-Fi profile associated with the AP 214 used to connect to the UMA network 204. The frequency counter and optionally maximum UMA connection time, for example, are updated. The frequency counter may, in some embodiments, be incremented only when a duration of the connection to the UMA network 204 exceeds a threshold duration. This debounces short or spurious connections to the UMA network 204 which are insufficient to maintain a voice call or data session while tracking voice calls or data sessions of short duration. The threshold duration may be, for example, 10, 15 or 30 seconds. The maximum UMA connection time, total successful HOs performed, total unsuccessful HOs performed, HO ratio/rate, or longest UMA session (e.g., voice call) are also updated, as required.

Figure 3:
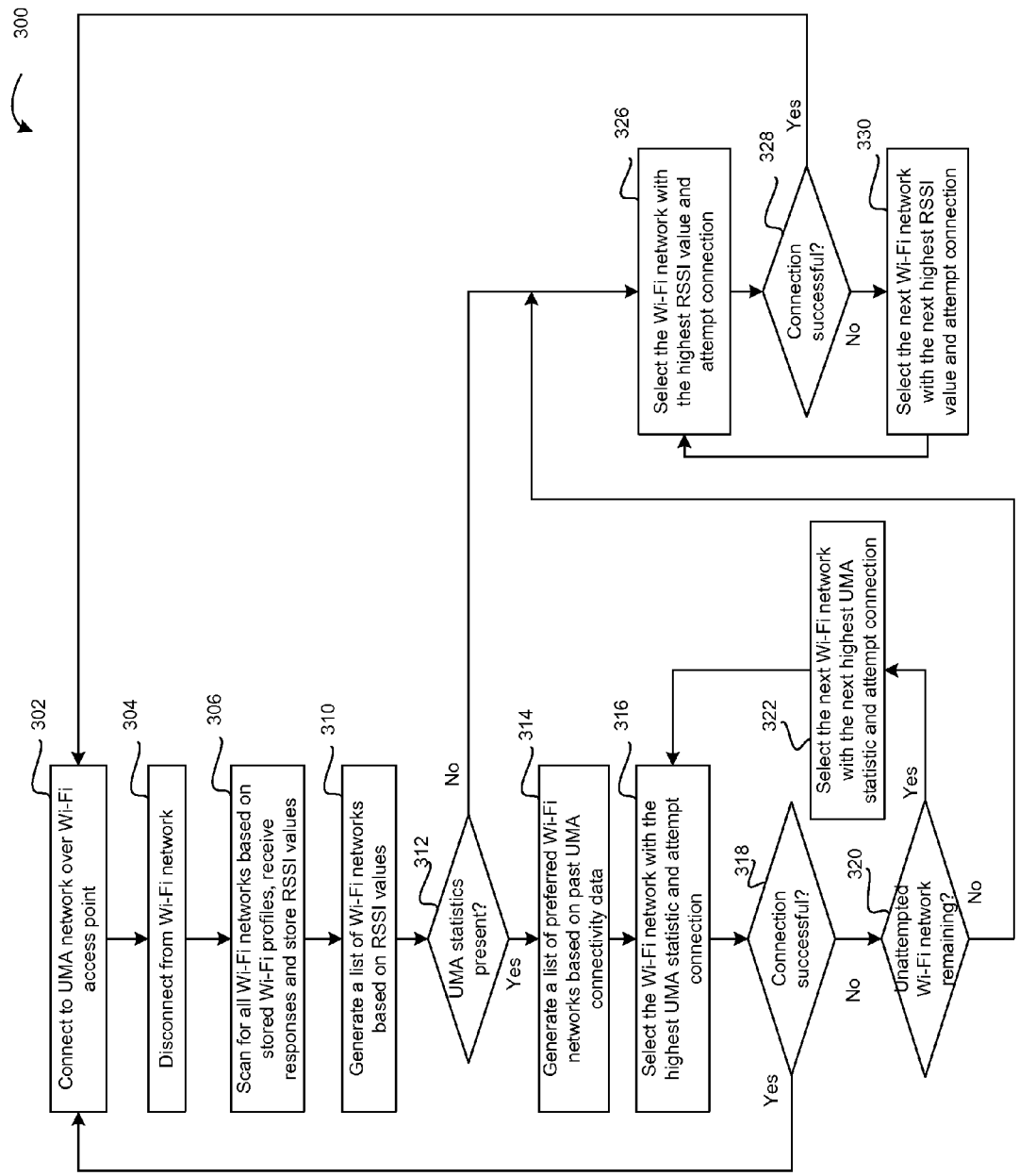
FIG. 3 is a flowchart illustrating a method for UMA network access on a mobile station in accordance with one embodiment of the present disclosure.

Referring now to FIG. 3, one embodiment of a method 300 for use by a mobile station 100 for connecting to a UMA network 204 over a wireless access point will be described. The method 300 may be carried out by software executed, for example, by the processor 102. Coding of software for carrying out such a method 300 is within the scope of a person of ordinary skill in the art given the present disclosure. The method 300 may contain additional or fewer processes than shown and/or described, and may be performed in a different order. Computer-readable code executable by at least one processor 102 of the mobile station 100 to perform the method 300 may be stored in a computer-readable medium such as the memory 110.

In the embodiment of FIG. 3, the mobile station 100 accesses the UMA network 204 using Wi-Fi. It is possible that the mobile station 100 and UMA network 204 may use another unlicensed wireless technology based on the IEEE 802.11 standards (e.g., an alternate WLAN technology) or possibly even the IEEE 802.15 standards (e.g., Bluetooth or alternate WPAN technology) in other embodiments.

First, a mobile station 100 connects to a Wi-Fi network via an AP 214 (302), for example, using a Wi-Fi profile included in the Wi-Fi network list 152 in the memory 110 of the mobile station 100. When connecting to a new Wi-Fi network, a new Wi-Fi profile for the Wi-Fi network is added to the Wi-Fi network list 152 after connection and authentication details are exchanged. Next, the mobile station 100 connects to a UMA network 204 via the AP 214.

The mobile station 100 later disconnects from the AP 214, thereby losing Wi-Fi and UMA connectivity (304). The mobile station 100 roves-out by switching from Wi-Fi mode to cellular mode. The mobile station 100 may disconnect from the AP 214 because it moved out of Wi-Fi coverage. There are other numerous reasons why the mobile station 100 may disconnect from an AP 214. The reason for disconnecting from the AP 214 is not relevant to the teachings of the present disclosure.

Each time the mobile station 100 disconnects from the UMA network 204, for any reason, the mobile station 100 updates the UMA idle mode parameters 154 and/or UMA session mode parameters 158, as required, for the Wi-Fi profile associated with the AP 214 used to connect to the UMA network 204. The frequency counter may be updated after connecting to the UMA network 204 rather than after disconnecting from the UMA network 204, if desired.

The mobile station 100 then actively scans for APs 214 by sending probe requests to all of the Wi-Fi networks corresponding to the Wi-Fi profiles in the Wi-Fi network list 152 (306). Each Wi-Fi profile included in the Wi-Fi network list 152 is identified by a respective SSID. The mobile station 100 receives probe responses from each AP 214 associated with the scanned Wi-Fi profiles which are available (e.g., in range of the mobile station 100).

The probe response includes a frame defined by the IEEE 802.11 standard. The frame has a control field that describes the IEEE 802.11 protocol version, frame type, other indicators, and connectivity data. The probe response includes a BSSID of the AP 214, the SSID of the wireless network associated with the AP 214, RSSI, the signal level (%), signal dBm, noise level (%) and noise dBm. In the described examples, RSSI values are reported in dBm which, for example, may be converted from a unitless measure to dBm in accordance with known techniques such as using the Inverse Square Law. An example of such a technique is described in Converting Signal Strength Percentage to dBm Values, published by WildPackets, Inc., November 2002, available online at http://www.wildpackets.com/elements/whitepapers/Converting_Signal_Strength.pdf. Alternatively, in other embodiments RSSI values may be reported as unitless measures expressed, for example, as a one-byte unsigned integer ranging from 0 to RSSI_Max where RSSI_Max is an integer which depends on the specific communication subsystem 104 and/or its vendor.

The RSSI, the signal level (%), signal dBm, noise level (%) and noise dBm each provide a signal quality indication. In some embodiments, a signal quality indicator based on one or more of the signal quality indications may be determined by the mobile station 100. Example mobile station 100 signal quality indicators which may be assigned to an AP 214 based on the applied signal quality indications are WLAN_SIGQUAL_POOR, WLAN_SIGQUAL_AVERAGE, WLAN_SIGQUAL_GOOD, WLAN_SIGQUAL_VERY_GOOD and WLAN_EXCELLENT. The signal quality indicators are text labels based on the technical signal quality indications.

The RSSI value is stored for each AP 214 from which the mobile station 100 receives a probe response, for example, in RAM 108. Other connectivity data in the probe response may be stored in addition to the RSSI value. When more than one AP 214 of a particular Wi-Fi network is in range of the mobile station 100, the mobile station 100 stores the RSSI value reported by each of the responding APs 214 as well as the BSSID of the AP 214 reporting the highest RSSI value. An example of the responses from the APs 214 is shown below.

| Wireless AP | RSSI |
|---|---|
| BSSID1 (SSID1 - AP1) | −67 dBm |
| BSSID2 (SSID2 - AP1) | −69 dBm |
| BSSID3 (SSID3 - AP1) | −70 dBm |
| BSSID4 (SSID1 - AP2) | −72 dBm |
| BSSID5 (SSID3 - AP2) | −80 dBm |
| BSSID6 (SSID1 - AP3) | −82 dBm |

Next, a Wi-Fi RSSI network list 161 is generated based on the RSSI values from the AP probe responses (310). One or more RSSI-based criteria may be used to select the Wi-Fi networks in the Wi-Fi RSSI network list 161. The RSSI-based criteria may vary between embodiments. The RSSI-based criteria may comprise a delta quality threshold of the RSSI values (e.g., maximum difference in RSSI values), an RSSI quality threshold, or both.

Figure 5:
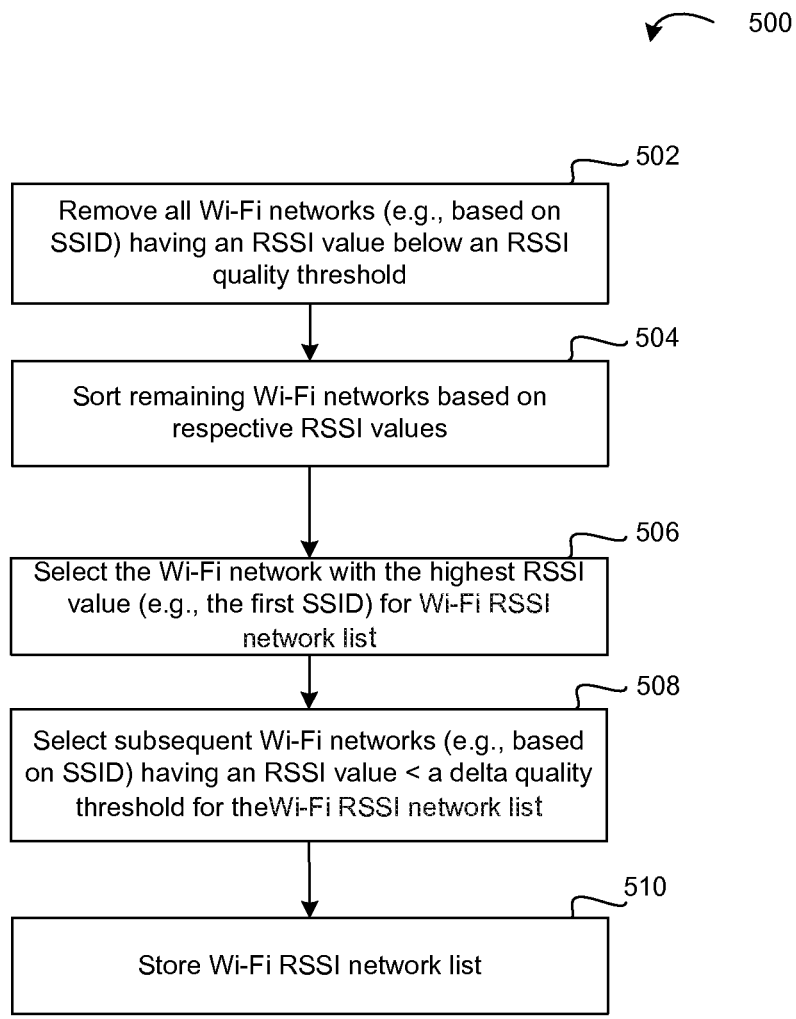
FIG. 5 is a flowchart illustrating a method for sorting wireless networks in accordance with one embodiment of the present disclosure.

An example method 500 for generating the Wi-Fi RSSI network list 161 is shown in FIG. 5. The method 500 may be carried out by software executed, for example, by the processor 102. Coding of software for carrying out such a method 500 is within the scope of a person of ordinary skill in the art given the present disclosure. The method 300 may contain additional or fewer processes than shown and/or described, and may be performed in a different order. Computer-readable code executable by at least one processor 102 of the mobile station 100 to perform the method 500 may be stored in a computer-readable medium such as the memory 110. All Wi-Fi networks having an RSSI value below an RSSI quality threshold are removed (502). When more than one AP 214 of a particular Wi-Fi network is in range of the mobile station 100 as in the above example, the AP 214 having the highest RSSI value is used for the Wi-Fi network in the Wi-Fi RSSI network list 161. The highest RSSI value of the AP 214 may be stored, for example in RAM 108 as a runtime parameter along with its BSSID. After removing the Wi-Fi networks having an RSSI value below an RSSI quality threshold, the remaining Wi-Fi networks are sorted into a descending order of RSSI values (504).

The Wi-Fi network having the highest RSSI value is selected as a first Wi-Fi network in a Wi-Fi RSSI network list 161 (506). All Wi-Fi networks having an RSSI value within a delta quality threshold of the first Wi-Fi network (i.e., the Wi-Fi network having the highest RSSI value) are selected (508), added to the Wi-Fi RSSI network list 161 in descending order of RSSI value, and then stored (510), for example in RAM 108 as a runtime parameter. Using a delta quality threshold, Wi-Fi networks in the Wi-Fi RSSI network list 161 are selected based on RSSI values so that the RSSI value for each Wi-Fi network in the Wi-Fi RSSI network list 161 is within a delta quality threshold. The delta quality threshold may be any suitable value and may be configured or tuned by the mobile network service provider. The delta quality threshold may be, for example, 3 dBm or 5 dBm in some embodiments.

The Wi-Fi networks may also be selected so that none of the Wi-Fi networks in the Wi-Fi RSSI network list 161 have an RSSI value which is below an RSSI quality threshold. The RSSI quality threshold may be any suitable value and may be configured or tuned by the mobile network service provider. The RSSI quality threshold may be, for example, −85 dBm in some embodiments. The RSSI quality threshold may differ depending on whether the mobile station 100 is in idle mode or session mode when the method 300 is performed. A delta quality threshold, RSSI quality threshold, or both may be set by the mobile network service provider during provisioning of the mobile station 100 or via IT policy pushed to the mobile station 100. In other embodiments, the RSSI quality threshold may not be considered.

The Wi-Fi networks in the Wi-Fi RSSI network list 161, in some embodiments, are selected so that the Wi-Fi networks having the highest RSSI value (e.g., −67 dBm) of the available APs 214 is selected as the first Wi-Fi network in the Wi-Fi RSSI network list 161. All Wi-Fi networks having an AP 214 with an RSSI value within a delta quality threshold (e.g., 3 dBm) and above an RSSI quality threshold (e.g., −85 dBm) are then selected and added to the Wi-Fi RSSI network list 161 in decreasing order of RSSI value. Based on the above example, an example of a Wi-Fi RSSI network list 161 in which Wi-Fi networks have a delta quality threshold of 3 dBm and an RSSI quality threshold of −85 dBm is shown below.

| Wi-Fi network (SSID) | RSSI |
| --- | --- |
| SSID1 | −67 dBm (SSID1 - AP1) |
| SSID2 | −69 dBm (SSID2 - AP1) |
| SSID3 | −70 dBm (SSID3 - AP1) |

Next, the mobile station 100 determines whether any past UMA connectivity data/statistics for previous UMA connections are available for the Wi-Fi networks in the Wi-Fi RSSI network list 161 (312), i.e., whether UMA idle mode parameters 154 or UMA session mode parameters 158 exist for the Wi-Fi networks in the Wi-Fi RSSI network list 161. The mobile station 100 may determine whether any past UMA connectivity data for previous UMA connections are available for the Wi-Fi networks in the Wi-Fi RSSI network list 161 (e.g., whether UMA idle mode parameters 154 or UMA session mode parameters 158 are stored in memory 110) or may be sensitive to whether the mobile station 100 is in idle more or session mode. The mobile station 100, in some embodiments, may determine whether any UMA connectivity data specific to session mode is available when the mobile station 100 is in session mode, i.e. whether UMA session mode parameters 158 are stored in memory 110 for the Wi-Fi networks in the Wi-Fi RSSI network list 161. Similarly, the mobile station 100, in some embodiments, may determine whether any UMA connectivity data specific to idle mode is available when the mobile station 100 is in idle mode, i.e. whether UMA idle mode parameters 154 are stored in memory 110 for the Wi-Fi networks in the Wi-Fi RSSI network list 161.

When UMA connectivity data is available, a list of UMA preferred Wi-Fi networks is generated (314) based on UMA connectivity data. The UMA connectivity data may be UMA idle mode parameters 154 or UMA session mode parameters 158, depending on whether the mobile station 100 is in idle more or session mode to generate the UMA Wi-Fi network list 156 or UMA HO Wi-Fi network list 160. In other embodiments, the past connectivity data may comprise the time taken for a Wi-Fi network to acquire UMA connectivity and the APs 214 in the list of UMA preferred Wi-Fi networks may be selected based on least time taken to acquire UMA connectivity.

When the mobile station 100 is in idle mode and UMA idle mode parameters 154 are available, the Wi-Fi RSSI network list 161 is filtered to remove Wi-Fi networks in the Wi-Fi RSSI network list 161 which do not have UMA connectivity data and the list of Wi-Fi networks is sorted based on one or more of the UMA idle mode parameters 154 such as the frequency counter and/or maximum UMA connection time to generate the UMA Wi-Fi network list 156. The UMA Wi-Fi network list 156 is a list of Wi-Fi networks sorted in a connectivity order (priority rank) based on the UMA idle mode parameters 154. The UMA idle mode parameters 154 used in sorting (e.g., determining the priority rank) may vary between embodiments. The preference or weight given to the UMA idle mode parameters 154 may also vary between embodiments. The UMA idle mode parameters 154 used by the mobile station 100 may be user configurable or may be set by the mobile network service provider during provisioning of the mobile station 100 or via IT policy pushed to the mobile station 100.

An example of a UMA Wi-Fi network list 156 based on maximum UMA connection time is shown below.

| Wi-Fi network (SSID) | AP | Maximum UMA connection time |
| --- | --- | --- |
| SSID3 | SSID3 - AP1 | 10 Hours |
| SSID2 | SSID2 - AP1 | 5 Hours |
| SSID1 | SSID1 - AP2 | 3 Hours |

When the mobile station 100 is in session mode and UMA session mode parameters 158 are available, the Wi-Fi RSSI network list 161 is filtered to remove Wi-Fi networks in the Wi-Fi RSSI network list 161 which do not have UMA connectivity data and the list of Wi-Fi networks is sorted based on one or more of the UMA session mode parameters 158 such as the handover counter or handover ratio to generate the UMA HO Wi-Fi network list 160. The UMA HO Wi-Fi network list 160 is a list of Wi-Fi networks sorted into a connectivity order (priority rank) based on the UMA session mode parameters 158. The particular UMA session mode parameters 158 used in sorting (e.g., determining the priority rank) may vary between embodiments. The preference or weight given to each of the UMA session mode parameters 158 may also vary between embodiments. The UMA session mode parameters 158 used by the mobile station 100 may be user configurable or may be set by the mobile network service provider during provisioning of the mobile station 100 or via IT policy pushed to the mobile station 100. In some embodiments, the mobile station 100 may use UMA idle mode parameters 154 in session mode when such data is available and but UMA session mode parameters 158 is not available.

An example of a UMA Wi-Fi network list 160 based on handover ratio is shown below.

| Wi-Fi network (SSID) | AP | Handover ratio |
| --- | --- | --- |
| SSID2 | SSID2 - AP1 | 9/9 |
| SSID3 | SSID3 - AP1 | 5/5 |
| SSID1 | SSID1 - AP2 | 3/2 |

The mobile station 100 selects the highest priority Wi-Fi network in the list of UMA preferred Wi-Fi networks and attempts to connect to the Wi-Fi network (316). The list of UMA preferred Wi-Fi networks is the UMA Wi-Fi network list 156 or UMA HO Wi-Fi network list 160, depending on whether the mobile station 100 is in idle mode or session mode. Based on the above example, when the mobile station 100 is in idle mode, the highest priority Wi-Fi network is the Wi-Fi network identified as SSID3 which has a maximum UMA connection time of 10 hours. When the mobile station 100 is in session mode, the highest priority Wi-Fi network is the Wi-Fi network identified as SSID2 which has a HO ratio of 9/9.

When the Wi-Fi network has more than one AP 214 in range, the mobile station 100 attempts to connect to the AP 214 of the Wi-Fi network having the highest RSSI value. This is typically stored in RAM 108 or memory 110 when generating Wi-Fi RSSI network list 161 during the method 500, or in response to receiving the probe responses. The BSSID of AP 214 having the highest RSSI value for a particular Wi-Fi network is used to connect to a particular AP 214 of the Wi-Fi network. Based on the above example, the mobile station 100 attempts to connect to "AP1" of the Wi-Fi network "SSID3"

when in idle mode. When in session mode, the mobile station 100 attempts to connect to "AP1" of the Wi-Fi network "SSID2".

When the mobile station 100 connects to the Wi-Fi network (decision block 318), processing continues to 302 where the mobile station 100 connects to the UMA network 204. The mobile station 100 roves-in by switching from cellular mode to Wi-Fi mode.

When the mobile station 100 does not connect to the Wi-Fi network (decision block 318), the mobile station 100 determines whether any Wi-Fi networks in the UMA Wi-Fi network list 156 or UMA HO Wi-Fi network list 160 remain unattempted (decision block 320). The mobile station 100 typically removes the Wi-Fi network for which the connection attempt failed from the UMA Wi-Fi network list 156 or UMA HO Wi-Fi network list 160, depending on which list is in use. When one or more Wi-Fi networks in the UMA Wi-Fi network list 156 or UMA HO Wi-Fi network list 160 remain unattempted, the mobile station 100 selects the next highest priority Wi-Fi network in the UMA Wi-Fi network list 156 or UMA HO Wi-Fi network list 160, and attempts connecting to the Wi-Fi network (322).

When no Wi-Fi networks in the UMA Wi-Fi network list 156 or UMA HO Wi-Fi network list 160 remain unattempted (decision block 320), or when UMA connectivity data is not available (decision block 312), the mobile station 100 selects the first Wi-Fi network in the Wi-Fi RSSI network list 161 having the highest RSSI value and attempts to connect to the Wi-Fi network (326). When the mobile station 100 connects to the Wi-Fi network (decision block 328), processing continues to 302 where the mobile station 100 connects to the UMA network 204. When the mobile station 100 does not connect to the Wi-Fi network (decision block 328), the mobile station 100 selects the next Wi-Fi network in the Wi-Fi RSSI network list 161 having the next highest RSSI value and attempts to connect to the Wi-Fi network. The mobile station 100 continues to select Wi-Fi networks in the Wi-Fi RSSI network list 161 until the mobile station 100 connects to a Wi-Fi network or UMA access mode is terminated, for example, by input received by the mobile station 100.

The mobile station 100 typically removes the Wi-Fi network for which the connection attempt failed from the Wi-Fi RSSI network list 161. In other embodiments, this may not occur and the mobile station 100 continues to select Wi-Fi networks in the Wi-Fi RSSI network list 161, restarting at the top of the Wi-Fi RSSI network list 161 if the end of the list is reached until the mobile station 100 connects to a Wi-Fi network or UMA access mode is terminated, for example, by input received by the mobile station 100.

In other embodiments, the Wi-Fi network list 152 may be used when the Wi-Fi RSSI network list 161 has been exhausted. In such embodiments, the mobile station 100 may select Wi-Fi networks in the Wi-Fi network list 152 and attempt to connect the respective Wi-Fi network, restarting at the top of the Wi-Fi network list 152 if the end of the list is reached, until the mobile station 100 connects to a Wi-Fi network or UMA access mode is terminated, for example, by input received by the mobile station 100. In yet other embodiments, a modified Wi-Fi network list may be used instead of the Wi-Fi network list 152, the modified Wi-Fi network list is generated from the Wi-Fi network list 152 by sorting based on RSSI values similar to the Wi-Fi RSSI network list 161 but without considering the delta quality threshold and/or RSSI quality threshold.

In yet other embodiments, the Wi-Fi network list 152 may be used rather than the Wi-Fi RSSI network list 161 when no Wi-Fi networks in the UMA Wi-Fi network list 156 or UMA HO Wi-Fi network list 160 remain unattempted (decision block 320), or when UMA connectivity data is not available (decision block 312).

The mobile station 100, when implementing the method 300, attempts to reconnect to a UMA-enabled Wi-Fi network having the highest RSSI value and favourable past UMA connectivity data (based on UMA idle mode parameters 154 or UMA session mode parameters) over a predetermined period of time (e.g., previous n hours). This may reduce the time required to re-establish Wi-Fi and UMA connectivity by first attempting to connect to Wi-Fi networks with a high RSSI value and favourable past UMA connectivity data.

Figure 4:
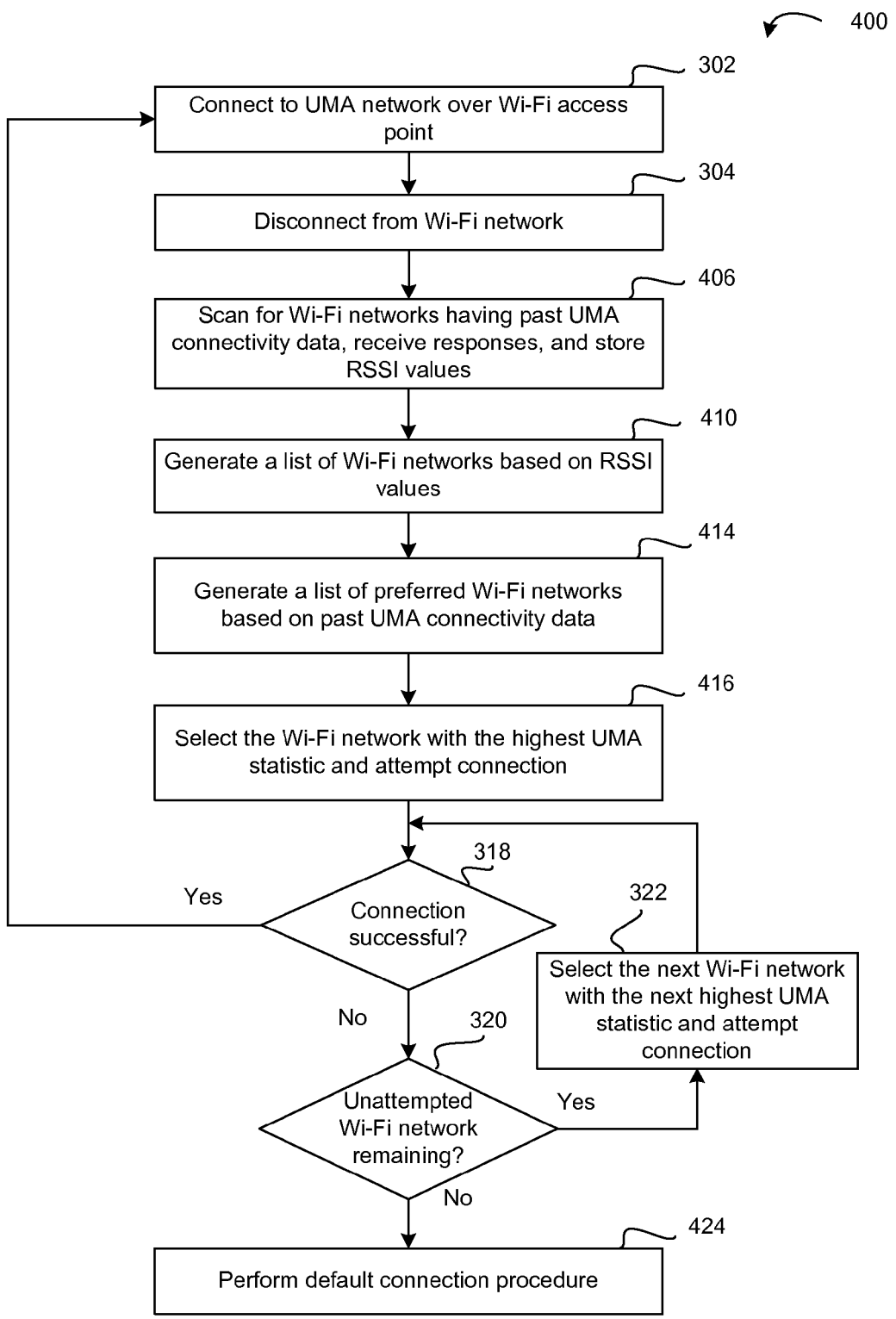
FIG. 4 is a flowchart illustrating a method for UMA network access on a mobile station in accordance with another embodiment of the present disclosure.

Referring now to FIG. 4, another embodiment of a method 400 for use by a mobile station 100 for connecting to a UMA network 204 over an AP 214 will be described. In this method, Wi-Fi networks without past UMA connectivity data are not initially scanned. Wi-Fi networks without past UMA connectivity data may be scanned later in some embodiments, but only after any Wi-Fi networks having past UMA connectivity data have been attempted and no Wi-Fi connection is made. The method 400 may be carried out by software executed, for example, by the processor 102. Coding of software for carrying out such a method 400 is within the scope of a person of ordinary skill in the art given the present disclosure. The method 400 may contain additional or fewer processes than shown and/or described, and may be performed in a different order. Computer-readable code executable by at least one processor 102 of the mobile station 100 to perform the method 400 may be stored in a computer-readable medium such as the memory 110.

In the embodiment of FIG. 4, the mobile station 100 accesses the UMA network 204 using Wi-Fi. It is possible that the mobile station 100 and UMA network 204 may use another unlicensed wireless technology based on the IEEE 802.11 standards (e.g., an alternate WLAN technology) or possibly even the IEEE 802.15 standards (e.g., Bluetooth or alternate WPAN technology) in other embodiments.

First, a mobile station 100 connects to an AP 214, for example, using a Wi-Fi profile stored in the Wi-Fi network list 152 in the memory 110 of the mobile station 100 (302). When connecting to a new Wi-Fi profile, the Wi-Fi profile is added to the Wi-Fi network list 152 after connection and authentication details are exchanged. Next, the mobile station 100 connects to a UMA network 204 via the AP 214.

The mobile station 100 later disconnects from the AP 214, thereby losing Wi-Fi and UMA connectivity (304). The mobile station 100 roves-out by switching from Wi-Fi mode to cellular mode. The mobile station 100 may disconnect from the AP 214 because it has moved out of Wi-Fi coverage. There are other numerous reasons why the mobile station 100 may disconnect from a Wi-Fi network. The reason for disconnecting from the Wi-Fi network is not relevant to the teachings of the present disclosure.

Each time the mobile station 100 disconnects from the UMA network 204, for any reason, the mobile station 100 updates the UMA idle mode parameters 154 and/or UMA session mode parameters 158, as required, for the Wi-Fi network associated with the AP 214 used to connect to the UMA network 204. The frequency counter may be updated after connecting to the UMA network 204 in rather than after disconnecting from the UMA network 204, if desired.

Next, the mobile station 100 actively scans for APs 214 by sending probe requests only to the Wi-Fi networks in the Wi-Fi network list 152 having past UMA connectivity data for previous UMA connections (406). The UMA connectivity data may be UMA idle mode parameters 154 or UMA session mode parameters 158, depending on whether the mobile station 100 is in idle mode or session mode. Each Wi-Fi profile included in the Wi-Fi network list 152 is identified by a respective SSID. The mobile station 100 receives probe responses from each AP 214 associated with the scanned Wi-Fi profiles which is available (e.g., in range of the mobile station 100). The probe response includes a frame defined by the IEEE 802.11 standard as described above.

The RSSI value is stored for each AP 214 from which the mobile station 100 receives a probe response, for example, in RAM 108. Other connectivity data in the probe response may be stored in addition to the RSSI value. When more than one AP 214 of a particular Wi-Fi network is in range of the mobile station 100, the mobile station 100 stores the RSSI value reported by each of the responding APs 214 as well as the BSSID of the AP 214 reporting the highest RSSI value.

An example of Wi-Fi networks having past UMA idle mode parameters 154 which may be available when the mobile station 100 is in idle mode is shown below.

| Wi-Fi network (SSID) | Maximum UMA connection time |
|---|---|
| SSID2 | 24 Hours |
| SSID4 | 4 Hours |
| SSID6 | 13 Hours |

An example of Wi-Fi networks having past UMA session mode parameters 158 which may be available when the mobile station 100 is in session mode is shown below.

| Wi-Fi network (SSID) | Handover rate |
|---|---|
| SSID1 | 9/9 |
| SSID3 | 5/5 |
| SSID4 | 3/2 |

Next, a Wi-Fi RSSI network list 161 is generated based on the RSSI values from the AP probe responses from APs 214 of Wi-Fi networks having a UMA statistics (410). One or more RSSI-based criteria may be used to select the Wi-Fi networks in the Wi-Fi RSSI network list 161. The RSSI-based criteria may vary between embodiments. The RSSI-based criteria may comprise a delta quality threshold of the RSSI values (e.g., maximum difference in RSSI values), an RSSI quality threshold, or both. An example method for generating the Wi-Fi RSSI network list 161 is shown in FIG. 5, described above.

An example of the list of UMA preferred Wi-Fi networks when the mobile station 100 is in session mode is shown below. In the shown example Wi-Fi network identified as "SSID1" was filtered out/removed when generating the Wi-Fi RSSI network list 161 because its RSSI value exceeded the RSSI quality threshold of −85 dBm.

| Wi-Fi network (SSID) | HO rate | RSSI |
|---|---|---|
| SSID3 | 5/5 | −67 dBm |
| SSID4 | 3/2 | −75 dBm |

Next, the mobile station 100 generates a list of UMA preferred Wi-Fi networks is generated (414) based on UMA idle mode parameters 154 or UMA session mode parameters 158, depending on whether the mobile station 100 is in idle more or session mode to generate the UMA Wi-Fi network list 156 or UMA HO Wi-Fi network list 160.

Next, the mobile station 100 selects the highest priority Wi-Fi network in the list of UMA preferred Wi-Fi networks and attempts to connect to the Wi-Fi network (416). The list of UMA preferred Wi-Fi networks is the UMA Wi-Fi network list 156 or UMA HO Wi-Fi network list 160, depending on whether the mobile station 100 is in idle mode or session mode. The particular UMA idle mode parameter 154 or UMA session mode parameters 158 used in determining the priority rank may vary between embodiments. Similarly, the preference or weight given to each of the UMA idle mode parameters 154 or UMA session mode parameters 158 when determining the priority rank for each Wi-Fi network in the list of UMA preferred Wi-Fi networks may vary between embodiments. The UMA idle mode parameters 154 and UMA session mode parameters 158 used by the mobile station 100 may be user configurable or may be set, for example, by IT policy. In the above example, the highest priority Wi-Fi is the Wi-Fi network identified as "SSID3", which has a handover ratio rate of 5/5 and an RSSI value of −67 dBm. When the mobile station 100 connects to the Wi-Fi network (decision block 318), processing continues to 302 where the mobile station 100 connects to the UMA network 204.

When the Wi-Fi network has more than one AP 214 in range, the mobile station 100 attempts to connect to the AP 214 of the Wi-Fi network having the highest RSSI value. This is typically stored in RAM 108 or memory 110 when generating Wi-Fi RSSI network list 161 during the method 500, or in response to receiving the probe responses. The BSSID of AP 214 having the highest RSSI value for a particular Wi-Fi network is used to connect to a particular AP 214 of the Wi-Fi network. Based on the above example, the mobile station 100 attempts to connect to "AP1" of the Wi-Fi network "SSID3" when in idle mode. When in session mode, the mobile station 100 attempts to connect to "AP1" of the Wi-Fi network "SSID2".

When the mobile station 100 connects to the Wi-Fi network (decision block 318), processing continues to 302 where the mobile station 100 connects to the UMA network 204. The mobile station 100 roves-in by switching from cellular mode to Wi-Fi mode.

When the mobile station 100 does not connect to the Wi-Fi network (decision block 318), the mobile station 100 determines whether any Wi-Fi networks in the UMA Wi-Fi network list 156 or UMA HO Wi-Fi network list 160 remain unattempted (decision block 320). The mobile station 100 typically removes the Wi-Fi network for which the connection attempt failed from the UMA Wi-Fi network list 156 or UMA HO Wi-Fi network list 160, depending on which list is in use. When one or more Wi-Fi networks in the UMA Wi-Fi network list 156 or UMA HO Wi-Fi network list 160 remain unattempted, the mobile station 100 selects the next highest priority Wi-Fi network in the UMA Wi-Fi network list 156 or UMA HO Wi-Fi network list 160, and attempts connecting to the Wi-Fi network (322).

When all Wi-Fi networks in the UMA Wi-Fi network list 156 or UMA HO Wi-Fi network list 160 have been unsuccessfully attempted by the mobile station 100 (decision block 320), the mobile station 100 uses a default Wi-Fi connection procedure (424). The default connection procedure may comprise actively scanning for APs 214 by sending probe requests to all of the Wi-Fi profiles in the Wi-Fi network list 152. Each Wi-Fi profile stored in the Wi-Fi network list 152 is identified by a respective SSID. The mobile station 100 receives probe responses from each AP 214 associated with the scanned Wi-Fi networks which is available (e.g., in range of the mobile station 100) to build a Wi-Fi network list. The mobile station 100 then selects the Wi-Fi network having the AP 214 with the highest RSSI value and attempts to connect to the Wi-Fi network. When the mobile station 100 connects to the Wi-Fi network, processing continues to 302 where the mobile station 100 connects to the UMA network 204. When the mobile station 100 does not connect to the Wi-Fi network, the mobile station 100 selects the Wi-Fi network having the AP 214 with the next highest RSSI value and attempts to connect to the Wi-Fi network. The mobile station 100 continues to select the Wi-Fi network having the AP 214 with the next highest RSSI value, restarting at the Wi-Fi network having the AP 214 with the highest RSSI value if all scanned Wi-Fi networks are attempted, until the mobile station 100 connects to a Wi-Fi network or UMA access mode is terminated, for example, by input received by the mobile station 100. Alternatively, the mobile station 100 may not attempt to connect to Wi-Fi networks after a failed connection attempt. In such instances, the method ends when all Wi-Fi networks have been attempted.

In other embodiments, method 400 may stop when all Wi-Fi networks in the UMA Wi-Fi network list 156 or UMA HO Wi-Fi network list 160 have been unsuccessfully attempted by the mobile station 100 (decision block 320) rather than using a default Wi-Fi connection procedure (424).

The mobile station 100, implementing the method 400, attempts to reconnect to a UMA-enabled Wi-Fi network with favourable past UMA connectivity data (based on UMA idle mode parameters 154 or UMA session mode parameters 158 depending on whether the mobile station 100 is in idle mode or session mode) over a predetermined period of time (e.g., previous n hours) and having the highest RSSI signal. This may reduce the time required to re-establish Wi-Fi and UMA connectivity. For a variety of reasons, the AP 214 having the strongest signal, e.g. highest RSSI value, may not provide the best UMA connectivity (e.g., handover performance). The described solution provides a mechanism to more quickly find the Wi-Fi networks having favourable past UMA connectivity and a strong signal. Wi-Fi networks without past UMA connectivity data are not initially scanned, thereby conserving battery power. In some embodiments, Wi-Fi networks without past UMA connectivity data may be scanned later but only after any Wi-Fi networks having past UMA connectivity data have been attempted and no Wi-Fi connection is made.

While described in the context of selecting a Wi-Fi network after disconnecting from a Wi-Fi network and when engaged in a UMA session, the methods 300, 400 and 500 may be used to select a Wi-Fi network for connection without disconnecting from a previous Wi-Fi network connection.

The methods 300 and 400 store past connectivity data (i.e., UMA idle mode parameters 154 and/or UMA session mode parameters 158) on a per network basis (i.e., per Wi-Fi, per SSID) to compare overall Wi-Fi network experiences and so may be useful in connecting to a Wi-Fi network, or reconnecting to a Wi-Fi network, when Wi-Fi connectivity is lost (for example, when attempting to regain access to a UMA network 204). Network selection is based on the UMA session experience on all APs 214 for each Wi-Fi network. In the example embodiments, UMA statistics (in idle or session mode) are collected based on the overall UMA session experience of all APs 214 (e.g. BSSIDs) for each Wi-Fi network. This allows the mobile station 100 to distinguish between Wi-Fi networks for the best UMA capability selection. The described methods may also be applied to selecting between APs 214 of a particular Wi-Fi network when a Wi-Fi network has multiple APs 214. This may be useful when roaming between AP 214 within a Wi-Fi network and connection quality is of importance, for example, when in a UMA session, when streaming content/data (e.g., multimedia) to the mobile station 100 over Wi-Fi (e.g., in an RTP session), when engaging in a VoIP or SIP call, or when downloading data to the mobile station 100 over Wi-Fi.

While described in the context of selecting a Wi-Fi network for UMA connectivity, the methods 300, 400 and 500 may also be applied outside of UMA to roving statistics other than the UMA statistics described above. In particular, the foregoing methods may be extended outside of the context of UMA networks for use in selecting a Wi-Fi network for access based on past connectivity data associated with the Wi-Fi networks of the available APs. The past connectivity data is stored per Wi-Fi network (i.e., per SSID basis) in the same manner as UMA statistics. The past connectivity data may be general Wi-Fi connectivity data or session-specific Wi-Fi connectivity data.

General Wi-Fi connectivity data may include, but is not limited to, an average (or previous) duration of past connections to the Wi-Fi network (Wi-Fi sessions), or an average (or previous) amount of data received and/or transmitted during past connections to the Wi-Fi network.

Session-specific connectivity data may include, but is not limited to: an average (or previous) amount of data downloaded (or streamed) to the mobile station 100; an average (or previous) amount of data uploaded from the mobile station 100 over the Wi-Fi network; a session-specific average (or previous) duration of connection over the Wi-Fi network; or a session-specific average (or previous) number of connection over the Wi-Fi network. The session data may be VPN session mode connectivity data when the mobile station 100 is engaged in a VPN session, VoIP session mode connectivity data when the mobile station 100 is engaged in a VoIP call, SIP session mode connectivity data when the mobile station 100 is engaged in a SIP session, RTP session mode connectivity data or streaming session mode connectivity data when the mobile station 100 is engaged in an RTP session, or streaming connectivity data when the mobile station 100 is receiving streaming content such as voice, audio, video or other multimedia content.

While the methods 300, 400 and 500 have been described as occurring in a particular order, some of the processes may be performed in a different order provided that the result of the changed order of any given process will not prevent or impair the occurrence of subsequent processes. Furthermore, some of the processes described above may be combined in other embodiments, and some of the processes described above may be separated into a number of sub-processes in other embodiments.

Improved Wi-Fi Network Access

Figure 6:
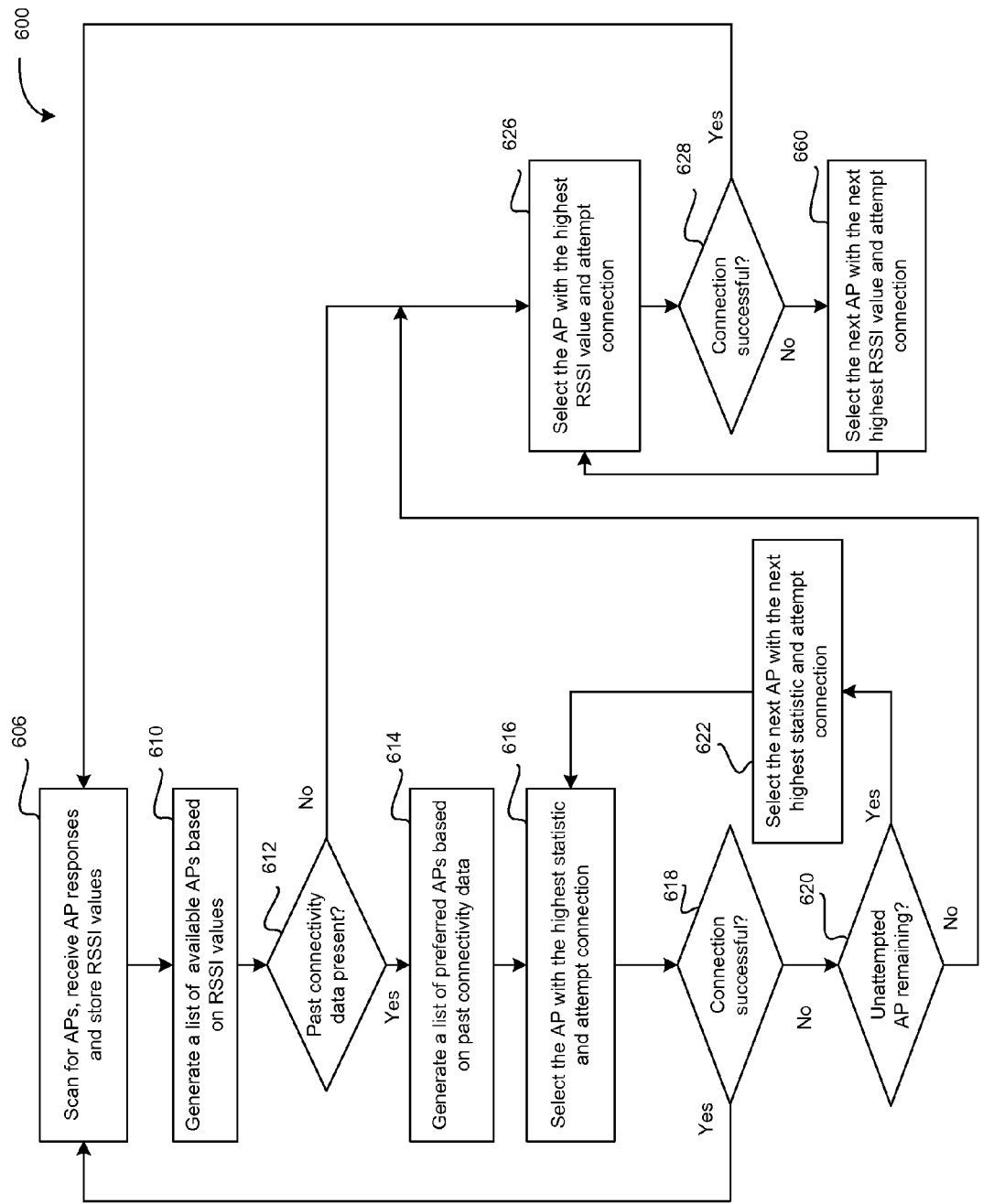
FIG. 6 is a flowchart illustrating a method for Wi-Fi network access on a mobile station in accordance with one embodiment of the present disclosure.

Referring now to FIG. 6, one embodiment of a method 600 for use by a mobile station 100 for accessing a Wi-Fi network will be described. In the method 600, the mobile station 100 distinguishes between the quality of the APs 214 of the same Wi-Fi network when moving from one AP 214 to another AP 214. The method 600 may be carried out by software executed, for example, by the processor 102. Coding of software for carrying out such a method 600 is within the scope of a person of ordinary skill in the art given the present disclosure. The method 600 may contain additional or fewer processes than shown and/or described, and may be performed in a different order. Computer-readable code executable by at least one processor 102 of the mobile station 100 to perform the method 600 may be stored in a computer-readable medium such as the memory 110.

Past connectivity data (e.g., usage statistics) is stored in association with each AP 214 (per BSSID) rather than each Wi-Fi network (per SSID) as in the method 500. The past connectivity data for each AP 214 may be stored in the Wi-Fi network list 152 in association with the BSSID of the APs 214 and the SSID of the respective Wi-Fi network. The provision of past connectivity data on a per AP 214 basis (i.e., per BSSID basis) allows the mobile station 100 to distinguish between APs 214 of a Wi-Fi networks for when selecting an AP 214 with best capabilities.

When the motion station 100 switches from the current AP 214 to another AP 214 within the same Wi-Fi network (same SSID as the current AP 214), the past connectivity data (e.g. statistics) may be roaming statistics for specific types of sessions modes including, but is not limited to, UMA calls, VPN, VoIP, SIP, RTP or streaming, or general cross-session roaming statistics. The past connectivity data may comprise one or any combination of a number of handovers performed using the Wi-Fi network over a period of time, a handover successful/unsuccessful ratio using the Wi-Fi network over a period of time, a time required to acquire network connectivity (e.g., Wi-Fi or UMA connectivity), or a session duration using the Wi-Fi network (i.e., the duration of the session per AP 214). The session duration may be session specific (e.g., UMA call, VPN, VoIP, SIP, RTP or streaming session) or a general cross-session measure.

While connected to a Wi-Fi network, the mobile station 100 passively scans for alternate APs 214 by sending probe requests (606). The mobile station 100 receives probe responses from each AP 214 which is available (e.g., in range of the mobile station 100). The probe response includes a frame defined by the IEEE 802.11 standard as described above. The alternate APs 214 may be used by the mobile station 100 when the AP 214 through which the mobile station 100 is connected falls below a threshold signal strength (i.e., the connection becomes too weak). When the signal strength of the current AP 214 through which the mobile station 100 is connected falls below the threshold signal strength, the mobile station 100 associates with a new AP 214 having a stronger wireless signal. Session persistence may be provided by the mobile station 100 for a more reliable connection should it lose a connection with an AP 214 before associating with a new AP 214. Other mechanisms for deciding when to re-associate (or switch to) with a new AP 214 may be used in other embodiments. While connected to the Wi-Fi network, the mobile station 100 updates the relevant connectivity data from time-to-time.

The RSSI value is stored for each AP 214 from which the mobile station 100 receives a probe response, for example, in RAM 108. Other connectivity data in the probe response may be stored in addition to the RSSI value. When more than one AP 214 of the Wi-Fi network is in range of the mobile station 100, the mobile station 100 stores the RSSI value reported by each of the responding APs 214 as well as the BSSID of the AP 214 reporting the highest RSSI value.

Next, a list of available APs is generated based on the RSSI values from the AP probe responses (610). One or more RSSI-based criteria may be used to select the APs 214 in the list of available APs. The RSSI-based criteria may vary between embodiments. The RSSI-based criteria may comprise a delta quality threshold of the RSSI values (e.g., maximum difference in RSSI values), an RSSI quality threshold, or both.

In one example of method for generating the list of available APs, the APs 214 having an RSSI value below an RSSI quality threshold are disregarded. The remaining Wi-Fi networks are sorted into a descending order of RSSI values. The AP 214 having the highest RSSI value is selected as a first AP 214 in the list of available APs. All APs 214 having an RSSI value within a delta quality threshold of the first AP 214 are then selected and added to the list of available APs in descending order of RSSI value. The list of available APs is then stored, for example in RAM 108 as a runtime parameter. Using a delta quality threshold, APs 214 in the list of available APs are each selected based on RSSI values so that the RSSI value for each AP 214 in the list of available APs within a delta quality threshold. The delta quality threshold may be any suitable value and may be configured or tuned. The delta quality threshold may be, for example, 3 dBm or 5 dBm in some embodiments.

The APs 214 may also be selected so that none of the APs in the list of available APs have an RSSI value which is below an RSSI quality threshold. The RSSI quality threshold may be any suitable value and may be configured or tuned. The RSSI quality threshold may be, for example, −85 dBm in some embodiments. The RSSI quality threshold may differ depending on the mode of the mobile station 100 at the time. In other embodiments, the RSSI quality threshold may not be considered.

The APs 214 in the list of available APs, in some embodiments, are selected so that the APs 214 having the highest RSSI value of the available APs 214 is selected as the first AP 214 in the list of available APs. All APs 214 having an RSSI value within a delta quality threshold (e.g., 3 dBm) and above an RSSI quality threshold (e.g., −85 dBm) are then selected and added to the list of available APs in decreasing order of RSSI value.

Next, the mobile station 100 determines whether any past connectivity data/statistics for previous Wi-Fi connections are available for the APs 214 the list of available APs (612). The nature of the past connectivity data depends on the mode of the mobile station 100. When the mobile station 100 is in UMA idle mode, the past connectivity data is UMA idle mode connectivity data. In some embodiments, the UMA idle mode connectivity data comprises a frequency of access of a UMA network using the Wi-Fi network over a period of time, a longest duration of UMA network access using the Wi-Fi network over a period of time, or both. When the mobile station 100 is in UMA session mode, the past connectivity data is UMA session mode connectivity data. In some embodiments, the UMA session mode connectivity data comprises a number of handovers performed using the Wi-Fi network over a period of time, a handover ratio using the Wi-Fi network over a period of time, or both.

When the mobile station 100 is engaged in a VoIP call, the past connectivity data is Voice over Internet Protocol (VoIP) connectivity data. Voice over IP (VoIP) may be implemented in different ways using both proprietary and open protocols and standards. Examples of technologies used to implement Voice over IP include H.323, IMS, Media Gateway Control Protocol (MGCP), SIP, Real-time Transport Protocol (RTP) and Session Description Protocol (SDP).

When the mobile station 100 is engaged in a Session Initiation Protocol (SIP) session (e.g., SIP call), the past connectivity data is SIP connectivity data. When the mobile station is engaged in a Real-time Transport Protocol (RTP) session, the past connectivity data is RTP connectivity data. When the mobile station is receiving streaming content, the past connectivity data is streaming connectivity data. When the mobile station is downloading content, the past connectivity data is downloading connectivity data.

When past connectivity data is available, a list of preferred APs 214 is generated (614) based on the past connectivity data. The APs 214 in the list of preferred APs may be selected based on least time taken to acquire network connectivity (e.g., UMA or Wi-Fi connectivity).

When the signal strength of the current AP 214 through which the mobile station 100 is connected falls below the threshold signal strength, the mobile station 100 re-associates with a new AP 214 in the list of available APs having a stronger wireless signal. In some embodiments, this comprises selecting the highest priority AP 214 in the list of available APs and attempts to connect to the Wi-Fi network (616). When the mobile station 100 connects to the AP 214 (decision block 618), processing continues to 606 where the mobile station 100 passively scans for APs 214. When in a UMA mode, the mobile station 100 may connect to a UMA network 204 associated with the Wi-Fi network after connecting to the Wi-Fi network.

When the mobile station 100 does not connect to the AP 214 (decision block 618), the mobile station 100 determines whether any APs 214 in the list of available APs remain unattempted (decision block 620). The mobile station 100 typically removes the AP 214 for which the connection attempt failed from the list of available APs. When one or more APs 214 remain unattempted, the mobile station 100 selects the next highest priority AP 214 in the list of available APs and attempts connecting to the AP (622).

When no APs 214 in the list of available APs remain unattempted (decision block 620), or when past connectivity data is not available (decision block 612), the mobile station 100 selects the first AP 214 in the list of available APs having the highest RSSI value and attempts to connect to the AP 214 (626). When the mobile station 100 connects to the AP 214 (decision block 628), processing continues to 606 where the mobile station 100 passively scans for APs 214. When in a UMA mode, the mobile station 100 may connect to a UMA network 204 associated with the Wi-Fi network after connecting to the Wi-Fi network.

When the mobile station 100 does not connect to the AP 214 (decision block 628), the mobile station 100 selects the next AP 214 in the list of available APs having the next highest RSSI value and attempts to connect to the AP 214. The mobile station 100 continues to select APs 214 in the list of available APs until the mobile station 100 connects to an AP 214 or the method is terminated, for example, by input received by the mobile station 100.

The mobile station 100 typically removes the AP 214 for which the connection attempt failed from the list of available APs. In other embodiments, this may not occur and the mobile station 100 continues to select APs 214 in the list of available APs, restarting at the top the list of available APs if the end of the list is reached until the mobile station 100 connects to an AP 214 or the method is terminated, for example, by input received by the mobile station 100.

The method 600 may be adapted to operate when the mobile station 100 is not connected to a Wi-Fi network. In such cases, the mobile station 100 passively scans for APs 214 by sending probe requests to any Wi-Fi network having a profile in the Wi-Fi network list 152 and possibly unknown Wi-Fi networks. The result may be used to select a Wi-Fi network having the strongest signal for connection (effectively selecting between APs 214 of different Wi-Fi networks), to select an AP 214 to associate with in a Wi-Fi network selected using another mechanism, or to select both a Wi-Fi network and an AP 214 within that Wi-Fi network.

Figure 7:
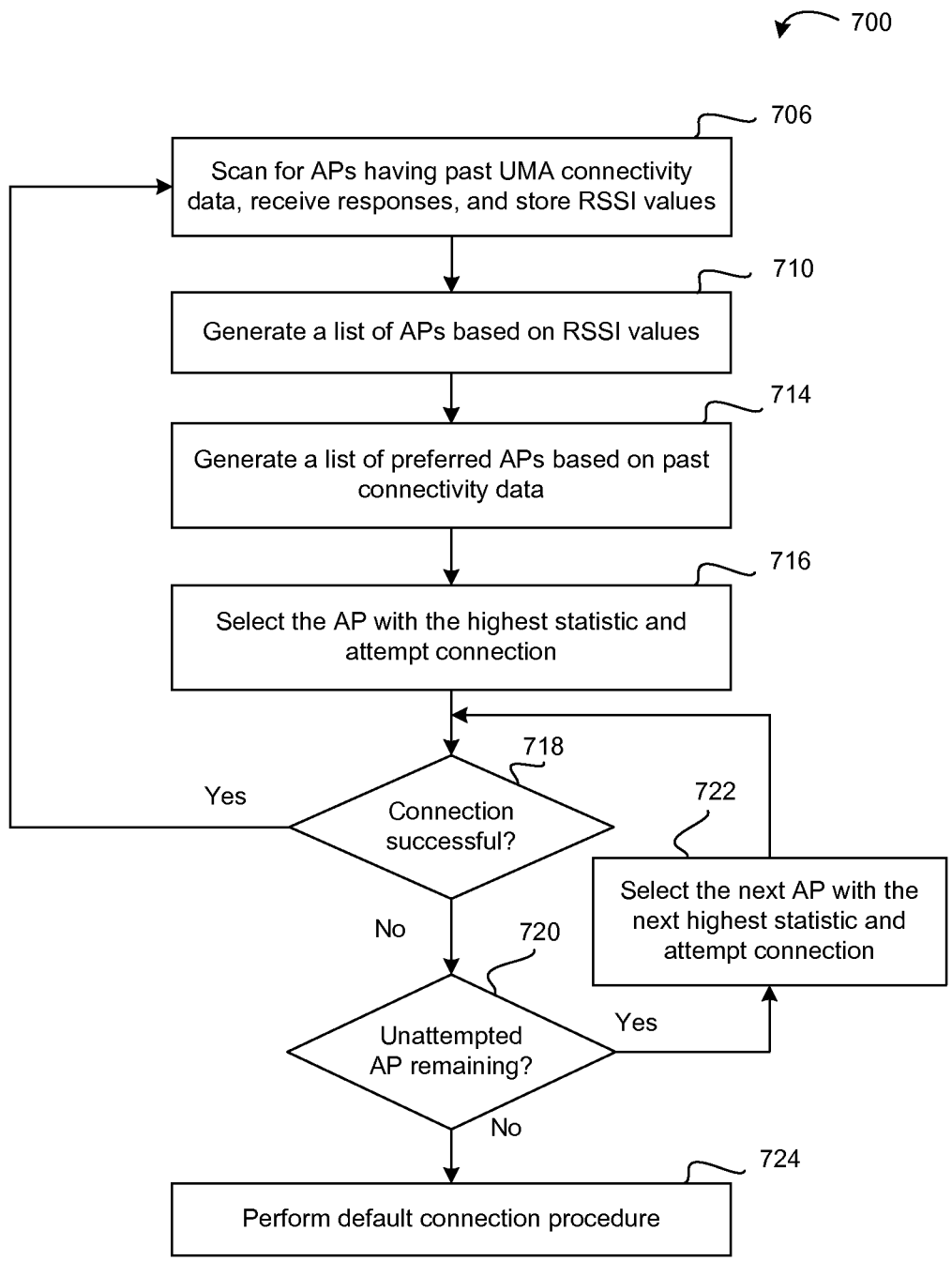
FIG. 7 is a flowchart illustrating a method for Wi-Fi network access on a mobile station in accordance with another embodiment of the present disclosure.

Referring now to FIG. 7, another embodiment of a method 700 for use by a mobile station 100 for accessing a Wi-Fi network will be described. In this method, APs 217 without past connectivity data are not initially scanned. APs without past connectivity data may be scanned later in some embodiments, but only after any APs having past connectivity data have been attempted and no connection is made. The method 700 may be carried out by software executed, for example, by the processor 102. Coding of software for carrying out such a method 700 is within the scope of a person of ordinary skill in the art given the present disclosure. The method 700 may contain additional or fewer processes than shown and/or described, and may be performed in a different order. Computer-readable code executable by at least one processor 102 of the mobile station 100 to perform the method 700 may be stored in a computer-readable medium such as the memory 110.

While connected to a Wi-Fi network, the mobile station 100 passively scans for alternate APs 214 by sending probe requests (606) to APs 214 having past connectivity data. The nature of the past connectivity data depends on the mode of the mobile station 100. The mobile station 100 receives probe responses from each AP 214 which is available (e.g., in range of the mobile station 100). The probe response includes a frame defined by the IEEE 802.11 standard as described above. While connected to the Wi-Fi network, the mobile station 100 updates the relevant connectivity data from time-to-time.

The RSSI value is stored for each AP 214 from which the mobile station 100 receives a probe response, for example, in RAM 108. Other connectivity data in the probe response may be stored in addition to the RSSI value. When more than one AP 214 of the Wi-Fi network is in range of the mobile station 100, the mobile station 100 stores the RSSI value reported by each of the responding APs 214 as well as the BSSID of the AP 214 reporting the highest RSSI value.

Next, a list of available APs is generated based on the RSSI values from the AP probe responses (710). One or more RSSI-based criteria may be used to select the APs 214 in the list of available APs. The RSSI-based criteria may vary between embodiments. The RSSI-based criteria may comprise a delta quality threshold of the RSSI values (e.g., maximum difference in RSSI values), an RSSI quality threshold, or both.

In one example of method for generating the list of available APs, the APs 214 having an RSSI value below an RSSI quality threshold are disregarded. The remaining Wi-Fi networks are sorted into a descending order of RSSI values. The AP 214 having the highest RSSI value is selected as a first AP 214 in the list of available APs. All APs 214 having an RSSI value within a delta quality threshold of the first AP 214 are then selected and added to the list of available APs in descending order of RSSI value. The list of available APs is then stored, for example in RAM 108 as a runtime parameter. Using a delta quality threshold, APs 214 in the list of available APs are each selected based on RSSI values so that the RSSI value for each AP 214 in the list of available APs within a delta quality threshold. The delta quality threshold may be any suitable value and may be configured or tuned. The delta quality threshold may be, for example, 3 dBm or 5 dBm in some embodiments.

The APs 214 may also be selected so that none of the APs in the list of available APs have an RSSI value which is below an RSSI quality threshold. The RSSI quality threshold may be any suitable value and may be configured or tuned. The RSSI quality threshold may be, for example, −85 dBm in some embodiments. The RSSI quality threshold may differ depending on the mode of the mobile station 100 at the time. In other embodiments, the RSSI quality threshold may not be considered.

The APs 214 in the list of available APs, in some embodiments, are selected so that the APs 214 having the highest RSSI value of the available APs 214 is selected as the first AP 214 in the list of available APs. All APs 214 having an RSSI value within a delta quality threshold (e.g., 3 dBm) and above an RSSI quality threshold (e.g., −85 dBm) are then selected and added to the list of available APs in decreasing order of RSSI value.

When the signal strength of the current AP 214 through which the mobile station 100 is connected falls below the threshold signal strength, the mobile station 100 re-associates with a new AP 214 in the list of available APs having a stronger wireless signal. In some embodiments, this comprises selecting the highest priority AP 214 in the list of available APs and attempts to connect to the Wi-Fi network (716). When the mobile station 100 connects to the AP 214 (decision block 718), processing continues to 706 where the mobile station 100 passively scans for APs 214. When in a UMA mode, the mobile station 100 may connect to a UMA network 204 associated with the Wi-Fi network after connecting to the Wi-Fi network.

When the mobile station 100 does not connect to the AP 214 (decision block 718), the mobile station 100 determines whether any APs 214 in the list of available APs remain unattempted (decision block 720). The mobile station 100 typically removes the AP 214 for which the connection attempt failed from the list of available APs. When one or more APs 214 remain unattempted, the mobile station 100 selects the next highest priority AP 214 in the list of available APs and attempts connecting to the AP (722).

When no APs 214 in the list of available APs remain unattempted (decision block 720), the mobile station 100 uses a default Wi-Fi connection procedure (724) the same as or similar to that described above. In other embodiments, method 700 may stop when all Wi-Fi networks in the list of available APs have been unsuccessfully attempted by the mobile station 100 (decision block 720) rather than using a default Wi-Fi connection procedure (724).

The methods 600 and 700 may also be adapted for use to connect a Wi-Fi network when the mobile station 100 is not connected a Wi-Fi network and the mobile station 100 detects several APs 214.

The methods 600 and 700 allow a mobile station 100 on a Wi-Fi network to find the best AP 214 of the same Wi-Fi network and re-associate with that AP 214 while a session is in progress. The methods 600 and 700 may be advantageous for streaming data, VoIP calls and UMA calls (e.g., when a mobile station 100 is in a "UMA Only mode" and HO to cellular networks are forbidden so that only UMA roaming between one AP to another AP of the same Wi-Fi network is possible), among other uses.

While described in the context of selecting an AP to re-associate with (or "switch to") when the signal strength of the current AP 214 through which the mobile station 100 is connected falls below the threshold signal strength, the methods 600 and 700 may be used to select an AP 214 of a Wi-Fi network for connection without an existing Wi-Fi network connection.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for network access on a mobile station comprising:
   scanning for Wi-Fi networks;
   receiving responses from available wireless access points (APs) of the Wi-Fi networks;
   generating a list of Wi-Fi networks sorted in accordance with signal quality indications of the available APs included in received responses;
   determining whether the mobile station is in idle mode or in session mode;
   further sorting the list of Wi-Fi networks in accordance with past Unlicensed Mobile Access (UMA) connectivity data associated with the Wi-Fi networks of the available APs wherein,
      in response to the mobile station being in idle mode, the past UMA connectivity data is UMA idle mode connectivity data comprising a frequency of access of a UMA network using the Wi-Fi network over a period of time, a longest duration of UMA network access using the Wi-Fi network over a period of time, or both; and
      in response to the mobile station being in session mode, the past UMA connectivity data is UMA session mode connectivity data comprising a number of handovers performed using the Wi-Fi network over a period of time, a handover successful/unsuccessful ratio using the Wi-Fi network over a period of time, or both; and
   selecting a Wi-Fi network having a highest rank from the sorted list of Wi-Fi networks; and
   attempting to connect to the selected Wi-Fi network.

2. The method of claim 1 further comprising:
   selecting an alternate Wi-Fi network from the sorted list of Wi-Fi networks when the attempt to connect to the selected Wi-Fi network fails, wherein the alternate Wi-Fi network is selected in accordance with past UMA connectivity data associated with the Wi-Fi networks of the available APs; and
   attempting to connect to the alternate Wi-Fi network.

3. The method of claim 2 wherein the selected Wi-Fi network and the alternate Wi-Fi network are selected from the sorted list of Wi-Fi networks in accordance with both past UMA connectivity data associated with the Wi-Fi networks of the available APs and signal quality indication of the available APs.

4. The method of claim 2 further comprising:
   generating a list of preferred Wi-Fi networks in accordance with the past UMA connectivity data, the list of preferred Wi-Fi networks including a first Wi-Fi network having an AP with the highest received signal strength indication (RSSI) value of the available APs and subsequent Wi-Fi networks having an AP with an RSSI value within a delta quality threshold of the AP of the first Wi-Fi network, wherein the Wi-Fi network and alternate Wi-Fi network are selected from the list of preferred of Wi-Fi networks.

5. The method of claim 4 wherein the Wi-Fi networks in the list of preferred Wi-Fi networks are selected so that each Wi-Fi network has an AP with an RSSI value greater than an RSSI quality threshold.

6. The method of claim 4 wherein the Wi-Fi networks in the list of preferred Wi-Fi networks are selected so that each Wi-Fi network has past UMA connectivity data.

7. The method of claim 1 wherein each Wi-Fi network is identified by a service set identifier (SSID) and the past UMA connectivity data of each Wi-Fi network is stored in association with the SSID for the respective Wi-Fi network.

8. The method of claim 1 wherein only stored Wi-Fi networks having past UMA connectivity data are scanned.

9. The method of claim 1 wherein the past UMA connectivity data is general Wi-Fi connectivity data or session-specific connectivity data.

10. The method of claim 1 further comprising:
storing Wi-Fi connectivity data in association with a respective Wi-Fi profile in response to disconnecting from a Wi-Fi network.

11. The method of claim 1 further comprising:
connecting to a UMA network after connecting to the Wi-Fi network.

12. The method of claim 1 further comprising:
storing UMA connectivity data in response to disconnecting from a UMA network, the UMA connectivity data being stored in association with a respective Wi-Fi profile used to connect to the UMA network.

13. A mobile station comprising:
a processor;
a display connected to the processor;
a cellular communication subsystem connected to the processor configured for communication over a cellular radio network;
a Wi-Fi communication subsystem connected to the processor configured for communication over a Wi-Fi network; and
a memory connected to the processor having stored thereon a Wi-Fi network list including one or more Wi-Fi profiles in accordance with IEEE 802.11 standards;
wherein the processor is configured for: causing scanning for Wi-Fi networks having a stored Wi-Fi profile; receiving responses from available APs of the Wi-Fi networks; generating a list of Wi-Fi networks sorted in accordance with signal quality indications of the available APs included in received responses; determining whether the mobile station is in idle mode or in session mode; further sorting the list of Wi-Fi networks in accordance with past Unlicensed Mobile Access (UMA) connectivity data associated with the Wi-Fi networks of the available APs wherein, in response to the mobile station being in idle mode, the past UMA connectivity data is UMA idle mode connectivity data comprising a frequency of access of a UMA network using the Wi-Fi network over a period of time, or both; and in network access using the Wi-Fi network over a period of time, or both; and in response to the mobile station being in session mode, the past UMA connectivity data is UMA session mode connectivity data comprising a number of handovers performed using the Wi-Fi network or a period of time, a handover successful/unsuccessful ratio using the Wi-Fi network over a period of time, or both; selecting a Wi-Fi network having a highest rank from the sorted list of Wi-Fi networks; and causing attempting to connect to the selected Wi-Fi network.

14. The device of claim 13 wherein the processor is further configured for selecting an alternate Wi-Fi network from the list of Wi-Fi networks when the attempt to connect to the selected Wi-Fi network fails, wherein the alternate Wi-Fi network is selected in accordance with past UMA connectivity data associated with the Wi-Fi networks of the available APs, signal quality indication of the available APs, or both; and attempting to connect to the alternate Wi-Fi network.

15. The device of claim 14 wherein the selected Wi-Fi network and the alternate Wi-Fi network are selected from the sorted list of Wi-Fi networks in accordance with both past UMA connectivity data of the available APs and signal quality indication of the available APs.

16. The device of claim 14 wherein the processor is further configured for: generating a list of preferred Wi-Fi networks including a first Wi-Fi network having an AP with the highest received signal strength indication (RSSI) value of the available APs and subsequent Wi-Fi networks having an AP with an RSSI value within a delta quality threshold of the AP of the first Wi-Fi network, wherein the Wi-Fi network and alternate Wi-Fi network are selected from the list of preferred of Wi-Fi networks.

17. The device of claim 16 wherein the Wi-Fi networks in the list of preferred Wi-Fi networks are selected so that each Wi-Fi network has an AP with an RSSI value greater than an RSSI quality threshold.

18. The device of claim 14 wherein the processor is further configured for connecting to a UMA network after connecting to the Wi-Fi network.

* * * * *